United States Patent [19]

Romohr

[11] Patent Number: 5,596,723
[45] Date of Patent: Jan. 21, 1997

[54] METHOD AND APPARATUS FOR AUTOMATICALLY DETECTING THE AVAILABLE NETWORK SERVICES IN A NETWORK SYSTEM

[75] Inventor: Steven D. Romohr, Austin, Tex.

[73] Assignee: Dell USA, LP, Austin, Tex.

[21] Appl. No.: 264,830

[22] Filed: Jun. 23, 1994

[51] Int. Cl.$^6$ ................................................. G06F 13/00
[52] U.S. Cl. .............. 395/200.16; 395/800; 364/DIG. 1; 364/242.94; 364/240.8
[58] Field of Search ............................. 395/800, 200.16; 370/94.1, 85.13

[56] References Cited

U.S. PATENT DOCUMENTS

| | | | |
|---|---|---|---|
| 4,638,313 | 1/1987 | Sherwood, Jr. et al. | 340/825.52 |
| 5,008,879 | 4/1991 | Fischer et al. | 370/85.2 |
| 5,150,464 | 9/1992 | Sidhu et al. | 395/200 |
| 5,265,239 | 11/1993 | Ardolino | 395/500 |
| 5,301,303 | 4/1994 | Abraham et al. | 395/500 |
| 5,331,634 | 7/1994 | Fischer | 370/94.1 |
| 5,392,454 | 2/1995 | Kowel et al. | 340/825.52 |
| 5,410,535 | 4/1995 | Yang et al. | 370/13 |
| 5,430,730 | 7/1995 | Sepulveda-Garese et al. | 370/94.3 |

*Primary Examiner*—Mehmet B. Geckil

[57] ABSTRACT

A method and apparatus for automatically detecting the prevalence of local area network operating system services and network frame type protocols that are being used on a network to which a computer system is being attached. When a computer system is newly attached to a network, the present invention transmits specific operating system broadcast inquiries using various frame type protocols across the network. The present invention then counts the network operating system specific responses for each of these supported frame types. These response counts indicate the prevalence of each network operating system and the prevalence of the network frame type protocol supported by each network operating system. The computer system then configures itself according to the most prevalent network operating system and frame type being used in the network, and thus a system administrator is not required to manually configure each computer being added to a network.

34 Claims, 23 Drawing Sheets

Example network configuration table for an Ethernet network

| | Netware | Vines |
|---|---|---|
| Ethernet II frame type | | III |
| Ethernet 802.3 Raw frame type | NN NN NN | |
| Ethernet 802.2 frame type | | |
| Ethernet 802.2 SNAP frame type | | |
| Token Ring 802.2 frame type | | |
| Token Ring 802.2 SNAP frame type | | |

FIG. 5A

Network Configuration Table

| | Netware | Vines |
|---|---|---|
| Ethernet II frame type | | |
| Ethernet 802.3 Raw frame type | | |
| Ethernet 802.2 frame type | | |
| Ethernet 802.2 SNAP frame type | | |
| Token Ring 802.2 frame type | | |
| Token Ring 802.2 SNAP frame type | | |

FIG. 5

| | Application | Layer 7 is concerned with the support of end-user application processes. |
|---|---|---|
| | Presentation | Layer 6 provides for the representation of the data. |
| | Session | Layer 5 performs administrative tasks and security. |
| | Transport | Layer 4 ensures end-to-end, error-free delivery. |
| | Network | Layer 3 is responsible for addressing and routing between subnetworks. |
| | Logical Link | Layer 2 is responsible for the transfer of data over the channel. |
| | Physical | Layer 1 handles physical signaling, including connectors, timing, voltages, and other matters. |

OSI Network Model layers

FIG. 6

Example network configuration table for a Token Ring network

| | Netware | Vines |
|---|---|---|
| Ethernet II frame type | | |
| Ethernet 802.3 Raw frame type | | |
| Ethernet 802.2 frame type | | |
| Ethernet 802.2 SNAP frame type | | |
| Token Ring 802.2 frame type | ≡ | |
| Token Ring 802.2 SNAP frame type | | ∺ ∥∥ |

FIG. 5B

Novell Netware protocol

Banyan Vines protocol

| Offset | Content | Type | Order |
|---|---|---|---|
| 0 | IPX Header | BYTE[30] | |
| 30 | Query Type | WORD | uword |
| 32 | Server Type | WORD | uword |

SAP Service Query Packet

FIG. 10

IPX Packet Structure*

| Offset | Content | Type |
|---|---|---|
| 0 | Checksum | BYTE[2] |
| 2 | Length | BYTE[2] |
| 4 | Transport Control | BYTE |
| 5 | Packet Type | BYTE |
| 6 | Destination Network | BYTE[4] |
| 10 | Destination Node | BYTE[6] |
| 16 | Destination Socket | BYTE[2] |
| 18 | Source Network | BYTE[4] |
| 22 | Source Node | BYTE[6] |
| 28 | Source Socket | BYTE[2] |
| 30 | Data Portion | byte[0 to 546] |

* All fields are high-low, which means that the most significant byte in a field is the first one. This differs from the native format for multiple-byte fields on an Intel processor, for which the most significant byte is the last one (low-high).

FIG. 11

VINES Ethernet Frame

VINES Token-Ring Frame

METHOD AND APPARATUS FOR AUTOMATICALLY DETECTING THE AVAILABLE NETWORK SERVICES IN A NETWORK SYSTEM

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to computer system networks, and more particularly to a method and apparatus which enables a computer being installed on a network to automatically detect the network operating system services and network frame types available on the network.

DESCRIPTION OF THE RELATED ART

The use of computer networks to facilitate the interoperability of computer systems has increased dramatically. A computer network allows a plurality of users to share various elements such as applications programs, peripherals, and communication links to other networks and files. A local area network (LAN) is essentially a combination of two or more personal computers or workstations that are physically and logically connected to each other. Local area networks can be interconnected to other networks in other parts of a building or in other cities, this type of configuration being commonly referred to as a wide area network or WAN.

A network typically includes at least one dedicated file server, two or more client computers and various shared peripherals. The file server is typically not used to run application software but rather is used to service requests frown the various client computers and to store files that are created by application programs executing on the client computers. The client computer provides requests to the file server for necessary files and also uses other resources of the network, such as printers and modems. When a client computer delivers a request for file access, software operating on the server ensures that the person placing the request has been granted access to the file. Once the request has been validated, the file server services the request, i.e., transmits the data corresponding to the file to the client computer. Thus, the principal task of a file server is to mediate numerous and often simultaneous requests for data, find the data, and provide the data to the requesting client computer. In some configurations, the file server might also store the application programs themselves.

Each node or computer on a network includes a network interface card, also referred to as a LAN adapter, which functions as an interface between the computer and the network cabling. The network interface card moves data to and from random access memory inside the computer and also controls the flow of data in and out of the network cabling system. The network interface card has a specialized port that matches the electrical signaling standards used on the cable and the specific type of cable connector.

There are various types of local area network standards and configurations available today. There are essentially two different methods for implementing a local area network, these being referred to as client/server and peer-to-peer networks. In a typical peer-to-peer network, any workstation or computer can be both a file server as well as a client searching for data or programs. A peer-to-peer network comprises a series of workstations that are usually linked together in a daisy-chain fashion, where each workstation is designated either as a client or a combination of client and server when the network is set up. A client/server network is the type of LAN most often used today. In this type of LAN, one or more central computers, referred to as file servers, are designated as central data storage locations and message handlers of the system. The remaining computer workstations are designated as clients and are all linked to the file servers.

The topology or physical layout of a local area network refers to the way in which nodes, e.g. workstations, printers, file servers and other devices, are physically connected to each other. The physical topology can take one of various forms, including a bus topology, ring topology, star topology or a hybrid topology. In a bus topology, a long cable acts as the data passageway or bus of the various nodes. The file server, workstations and other devices, such as printers, modems and faxes, are attached to the cable at different locations, and data travels to and from the workstations through the cable. In a ring topology, the workstations are connected to each other in a daisy-chain fashion and form a circle or ring. Data is transmitted from one node to the next, where each node or workstation examines data being passed along the ring. If the data is not destined for that workstation, the data is forwarded to the next workstation and so on. Since data travels in only one direction, there is no danger of data collision. However, any break in the connection of the network will cause the entire network to go down or become inoperable. In a star topology, all of the nodes in the network are connected to a central hub to which all connections are made. The central hub is in the form of a ring topology as described above, and each node is connected to the central hub through a bus. One advantage of a star topology is that if one line becomes broken or disconnected, only that node becomes inoperable, and the remaining portion of the network remains operable. In addition to these topologies, various hybrid topologies exist which combine the features of star, ring and bus topologies.

In addition to the physical topologies described above, a network typically includes a logical topology or data transfer protocol, which defines the method of data transfer between the various nodes on the network. One popular network data transfer protocol is referred to as Ethernet, which is used for networks utilizing a bus topology. A data transfer protocol is necessary for networks using a bus topology because of the possibility that two nodes or workstations may attempt to transmit data at the same time over the common bus. In other words, a data transfer protocol is necessary in a bus topology to prevent data collision. According to the Ethernet protocol in a bus topology, the network interface card in a node, such as a workstation or file sever, senses the change in voltage of the cable or bus before attempting to send a packet of data to its destination. If no voltage disruption is detected, the packet of data is transferred down the cable toward its destination. However, if the network interface card senses the presence of data, it waits a random amount of time before attempting to send a packet of information to its destination.

Another popular network or data transfer protocol is referred to as the Token Ring network topology developed by International Business Machines Corp. (IBM). The Token Ring topology utilizes a token passing data transfer protocol in conjunction with the ring topology described above. All of the nodes on the network are connected to each other through a circular cable, and the data transfer protocol for transferring data from node to node is based on the Token Ring concept of passing data from workstation to workstation in packets of information called tokens. In addition to a ring topology, a network employing a token passing protocol may employ a hybrid star/ring topology. In a hybrid star/ring topology, all of the nodes in the network are connected to a central hub called a multi-station access unit according to a star topology. The multi-station access unit is itself configured in a ring topology where data travels in a ring fashion from node access port to node access port. An advantage of this topology is that the Token Ring network can be treated like a star network where nodes can be added, deleted or modified without having to bring down the entire network.

A third type of network data transfer protocol is referred to as Arcnet, which is essentially a token passing protocol utilizing a bus/star topology. In a bus/star topology, the various nodes are connected to a central hub which acts as a bus for the network. The Arcnet topology was introduced in 1977 and is slower than other topologies, but is also very inexpensive and easy to install.

In addition to physical topology and data transfer protocol, another variable in a local area network is the network operating system. A network operating system is a family of programs that operate in the various network computers. Examples of networking software include programs such as Novell NetWare,™ Banyan VINES, LAN Server, LAN Manager, Artisoft,1υ and Lantastic™. In addition, operating systems such as Microsoft Windows™ for workgroups include built-in networking software. Macintosh™ computers also include built-in networking software for interoperability.

Network operating system software executing on the file server provides the server with the ability to share files with other devices across the network. When a network adapter and network communication software operating in a client computer deliver a request for file access to the file server, the network software executing in the file server ensures that the client making the request has been granted access to the file. Once the request has been validated, the file server software services the request. The network software executing on a file server is typically able to mediate simultaneous requests from the same data.

Network operating system software executing on a client computer provides the computer with the ability to act as a client so that it can use shared resources, i.e., request files from the file server and send print jobs to other server computers. Thus, client network software allows application programs running on a client computer to use disk drives, printers and other resources as if they were directly attached to the computer. For example, if an application such as a word processing program has a job to print, the print job would typically be transferred from the application to the computer operating system, such as DOS, with instructions to print to a specific port. The client network software operates to modify the computer's operating system so that any print jobs addressed to a certain port are redirected to the respective network printer. Likewise, for a client computer running an application program such as a database program that needs access to a file, the application provides the file name to the computer operating system along with the specified disk drive name. The client software operates to modify the operating system so that any request for data on this particular drive is redirected out across the network to the file server. Network software executing on a client computer may also allow the client to act as a print server, which involves allowing the client computer to accept print jobs from other client computers and print them on its locally attached printer.

Therefore, client network software operates with the internal operating system of a computer to route requests from application programs to file servers and print servers on the network. The principal element of client software is called a redirector. The redirector captures service requests that it has been programmed to recognize and routes these requests out of the client computer and across the network for service. In addition to the redirector, the client computer typically includes network communication software which packages requests from the client computer and sends these requests across the network. This software conforms to a specific protocol for addressing and also to ensure delivery and accuracy. Examples of network communications protocols include Apple File Protocol (AFP), Microsoft's NetBIOS Extended User Interface (NETBEUI) and Novell's Sequential Packet Exchange and Internetwork Packet Exchange (SPX and IPX).

One function of the network operating system is to package requests from applications running on a computer into a succession of data envelopes or frames for transmittal across the network. The various network data transfer protocols each typically include a plurality of different frame types. These different frame types vary in terms of the type of header information provided in each frame. Typically, the network interface card drivers operating on a respective node such as a client or server computer are configured to recognize a certain frame type.

Support for different standard frame types, for each data transfer protocol, varies among the different network operating systems. The Novell NetWare operating system supports four different frame types for the Ethernet protocol—Ethernet II, IEEE 802.3 "raw", IEEE 802.2, and IEEE 802.2 SNAP. Banyan VINES supports only the Ethernet II™ frame type. For the Token Ring protocol, both Novell Netware and Banyan VINES support two different frame types—IEEE 802.2 and IEEE 802.2 SNAP.

Digital Electronics Company, Intel Corporation and Xerox Corporation developed the Ethernet standard. The second revision of that standard is called Ethernet II. The Institute of Electrical and Electronic Engineers (IEEE) has also issued LAN standards that include a physical layer standard for Token-Ring (IEEE 802.5), a physical layer standard for Ethernet (IEEE 802.3), and a data link layer standard (IEEE 802.2) for use with both of those physical layer standards. Novell initially implemented the IEEE 802.3 standard before the IEEE had fully developed the IEEE 802.2 standard. That implimentation by Novell is called 802.3 "raw". After the IEEE 802.2 standard was developed, the Subnetwork Access Protocol (SNAP) was developed to overcome some limitations in the 802.2 standard.

To illustrate how a network operating system uses a data envelope frame to transmit data across a network, consider the Novell NetWare operating. system on an Ethernet network. The Novell NetWare network operating system software packages a directory read request into an IPX packet, and the network interface card then packages the IPX request into a respective Ethernet frame. Each IPX packet includes a data field as well as various transmission information including the source socket, source host, source network, destination source, destination host, destination network, packet type, length and error control. The Ethernet frame typically includes a synchronization preamble, Ethernet destination address, Ethernet source address, packet length, data field and error control information.

When a new client computer is being added to an existing network, the particular network topology, e.g. Ethernet, Token Ring, or Arcnet, is defined by the existing network, and the computer includes the appropriate network interface card depending on the network topology. However, the client computer being added to the network typically does not know the types of network operating systems provided on the network. Further, the client computer will not know the particular frame type or types being used by the network topology. For example, if an Ethernet topology is being used on the network, the computer system being added typically does not know the particular frame type protocol being used in the network.

A network administrator is typically required to individually configure each computer system being added to a network according to the network operating system and frame type protocol being used on the network. Usually, a network administrator is required to run an install utility on the computer being added to place the appropriate network operating system drivers onto the workstation and to configure the computer system for the appropriate frame type. This is generally a very time consuming process and, if done improperly, can result in erroneous operation.

In addition, when a new server is being added to an existing network, it would be highly desirable for the server to be able to automatically determine the network operating systems and frame types used by other servers in the network. This would enable the server to configure itself to the most prevalent operating system and frame type being used in the system. Also, for computers already attached and configured to a network, it would be highly desirable for a user to be able to determine the network operating systems and frame types available on the network.

Therefore, a method and apparatus is desired to allow a computer system to automatically detect the operating systems and frame types available on a network. For new client or server computers being added to a network, this would obviate the necessity of a network administrator having to manually configure each computer system being added to a network.

SUMMARY OF THE INVENTION

The present invention comprises a method and apparatus for automatically detecting the prevalence of local area network operating system services and network frame type protocols that are being used on a network. The present invention can be used for numerous purposes. In the preferred embodiment, the present invention is used to automatically configure a computer system to the most prevalent operating system and frame type being used on a network. In the preferred embodiment, when a computer system is newly attached to a network, the present invention transmits specific operating system broadcast inquiries using various frame types across the network. The present invention then counts the network operating system specific responses for each of these supported frame types. These response counts indicate the prevalence of each network operating system and the prevalence of the network frame type protocol supported by each network operating system. The computer system then configures itself according to the most prevalent network operating system and frame type being used on the network.

In the preferred embodiment, a user selects an automatic network configuration option from a startup menu to begin operation of the method of the present invention. The startup software will have already loaded the network interface card drivers and thus will know the logical topology being used on the network, such as Ethernet, Token Ring, Arcnet, or any other topology. If the computer system is being installed in an Ethernet network, the method begins by broadcasting a VINES Address Resolution Protocol (ARP) inquiry over the network using an Ethernet II frame type. The method broadcasts the inquiry, receives a response, if any, and adds any received response to a network configuration table. In the preferred embodiment, this sequence is performed three times. The method then broadcasts NetWare Service Advertising Protocol (SAP) inquiries using each of the four Ethernet frame types, receives any responses, and adds any responses to the network configuration table. As before, this sequence of operations is preferably performed three times. In an alternative embodiment, the method also broadcasts inquiries using Ethernet frame types for the LAN Server and LAN Manager operating systems, as well as others. If the computer is being installed in a Token Ring network, the method broadcasts VINES ARP inquiries using the 802.2 frame type and 802.2 SNAP frame type over the network, receives any responses, and adds any received responses to the network configuration table. As before, this sequence is preferably performed three times. The method then broadcasts NetWare SAP inquiries using the above frame types, receives any responses, and adds the responses to the network configuration table. As before, this sequence of operations is preferably performed three times. In an alternative embodiment, the method also broadcasts inquiries for the LAN Server and LAN Manager operating systems, as well as others.

After the various broadcast inquiries have been performed and the results tallied in the network configuration table, the method of the present invention examines the table to determine the most prevalent network operating system and frame type being used on the network. If the user accepts this configuration, the method then configures the computer system according to the most prevalent operating system and frame type.

Therefore, a method and apparatus for automatically detecting the network operating systems and frame types available on a particular network is disclosed. In the preferred embodiment, the automatic network detection method and apparatus of the present invention is used to automatically configure a computer attached to a network to the most prevalent network operating system and frame type being used on the network. Thus a system administrator is not required to manually configure each computer being added to a network.

BRIEF DESCRIPTION OF THE DRAWINGS

A better understanding of the present invention can be obtained when the following detailed description of the preferred embodiment is considered in conjunction with the following drawings, in which:

FIG. 5 illustrates a network configuration table used to keep track of network responses received by the automatic network configuration method of the present invention;

FIGS. 5A–B illustrate various examples of the network configuration table of FIG. 5 for certain types of networks;

FIG. 6 illustrates the various network model layers according to the open systems interface (OSI) model;

FIG. 10 illustrates a Service Advertising Protocol (SAP NetWare operating system;

FIG. 11 illustrates the IPX packet structure in the network layer of the Novel NetWare operating system;

DETAILED DESCRIPTION OF THE PREFERRED EMBODIMENT

The present invention comprises a method and apparatus for detecting the types services available on a network, and more particularly a method and apparatus for detecting the network operating systems and frame types available on a network. The present invention can be used for various purposes, including the configuration of client and server computers that are newly attached to a network, as well as for simply informing a user of the network operating systems and frame types available on a network. In the preferred embodiment described below, the present invention is incorporated into a client computer that is newly attached to a network and is used to detect the network operating systems and frame types available on a network so the client computer can automatically configure itself to the most prevalent network operating system and frame type used on the network.

Figure 1:
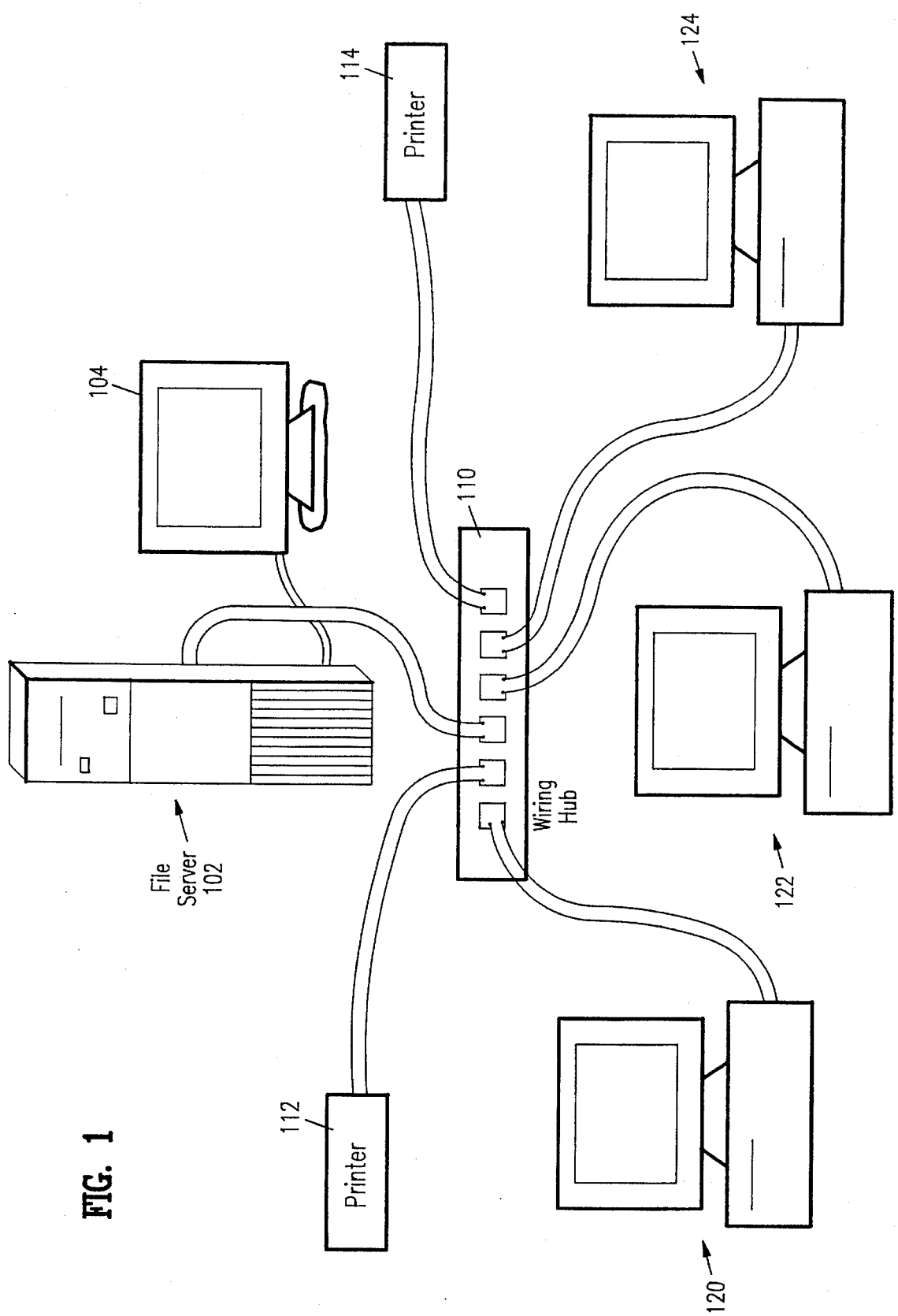
FIG. 1 illustrates a local area network configuration according to one embodiment of the invention.

Referring now to FIG. 1, a drawing illustrating a typical local area network configuration according to one embodiment of the invention is shown. It is noted that the present invention can be adapted to any of the various types of networks including wide area networks (WANs) among others. The network illustrated in FIG. 1 includes a file server 102, which includes associated video monitor 104. The file server 102 connects to a central wiring hub 110, as shown. Also connected to the wiring hub 110 are various printers 112 and 114, as well as various client computers 120, 122, and 124. It is noted that the local area network illustrated in FIG. 1 can use any of various types of network topologies, including a ring, star, bus, or a hybrid technology. The local area network may also use any of various logical topologies or data transfer protocols such as Ethernet or Token Ring, any of various network operating systems such as Novell NetWare or Banyan VINES, and any of various frame types.

When a new client computer, such as the computer 124, is being added to a local area network, such as that illustrated in FIG. 1, in prior art systems a network administrator or information services (IS) manager is required to manually configure the client computer according to the network operating system and data transfer frame type being used on the network, as discussed in the background section. This requirement that a network administrator manually configure each client computer requires a considerable amount of time and, if not done properly, can result in the client computer 124 not working. The preferred embodiment of the present invention comprises a method and apparatus which automatically configures a client computer according to the most prevalent network operating system and data frame type used on the network. This obviates the necessity of the network administrator having to manually configure each client computer, thus saving a considerable amount of time and expense. As discussed above, it is also noted that the method of the present invention may be adapted for other purposes, such as configuring a server computer or simply allowing a computer to query a network to which it is connected about the particular operating systems and frame types or other network services available on the network.

Figure 2:
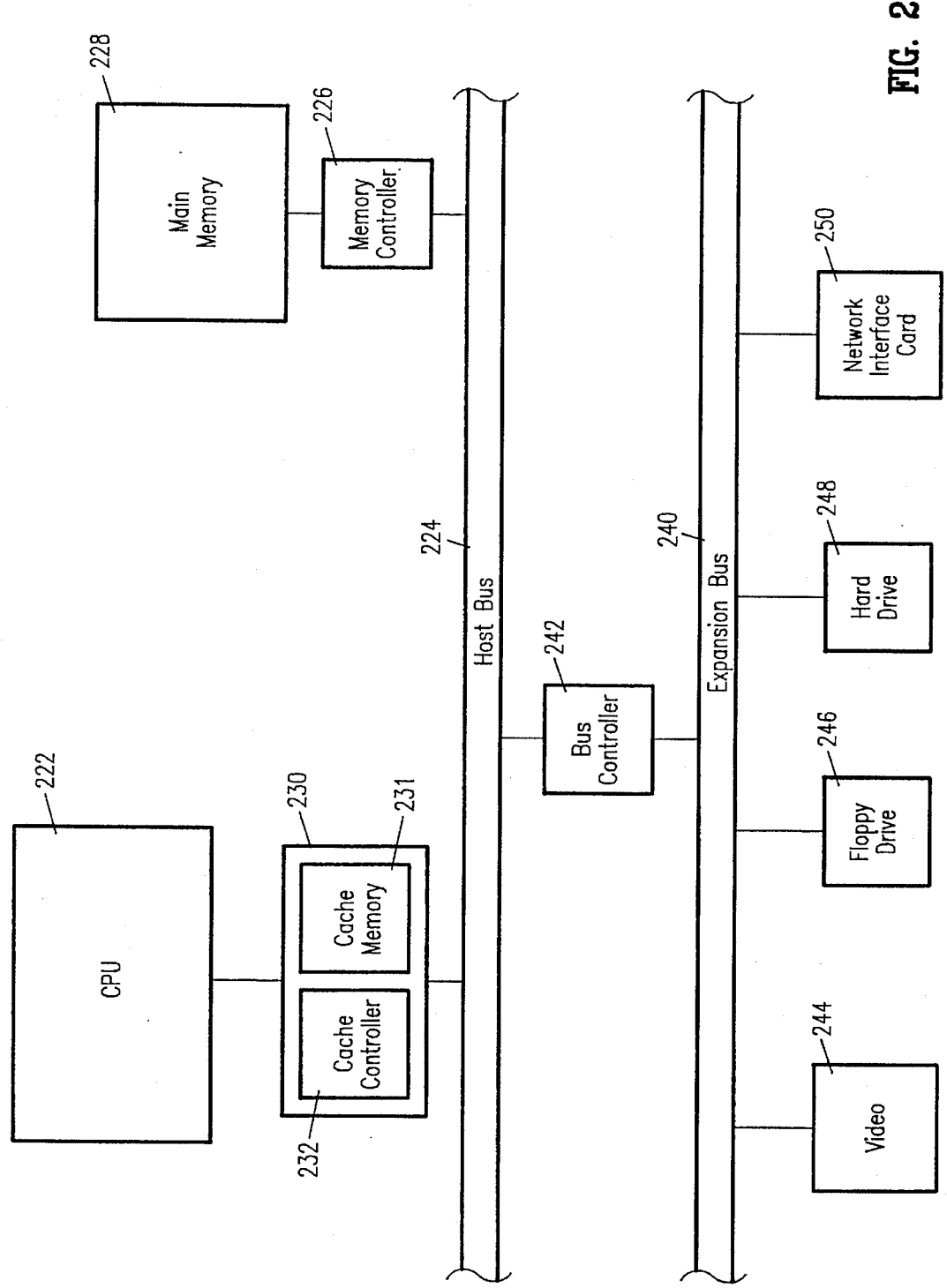
FIG. 2 is a block diagram of a client computer in the network of FIG. 1.

Referring now to FIG. 2, a block diagram illustrating one embodiment of the client computer system 124 being added to the network is shown. The elements of a computer system not necessary to understand the operation of the present invention have been omitted for simplicity. The computer system includes a central processing unit or CPU 222 which is coupled to a memory or host bus 224. In the preferred embodiment the CPU 222 is an Intel Pentium microprocessor, although it is noted that other processors may be used. The computer system may include a second level cache subsystem 230 coupled between the CPU 222 and host bus 224. The second level cache subsystem 230 comprises cache memory 23 1 and a cache controller 232. The host bus 224 includes address, data, and control portions. Main memory 228 is coupled to the host bus 224 by means of memory controller 226. The host bus 224 is coupled to an expansion or input/output (I/O) bus 240 by means of a bus controller 242. The expansion bus 240 includes slots for various other devices, preferably including video 244, a floppy drive 246 and hard drive 248. A network interface card 250 is also coupled to the expansion bus 240. The network interface card 250 operates to transmit data between the client computer 124 and various other nodes in the network, such as the file server 102, printers 112 and 114, and other client computers 120 and 122. It is noted that FIG. 2 illustrates only one embodiment of the client computer 124, and various other embodiments may be used. For example, the network interface card 250 may be directly attached to a CPU local bus such as the PCI (Peripheral Connect Interface) bus (not shown) or the VL bus (not shown).

The client computer 124 includes network operating software from various vendors, preferably including Novell NetWare and Banyan VINES. In an alternative embodiment, the client computer 124 also includes network operating software from other vendors, such as LAN Server, LAN Manager, and Lantastic, among others. In the preferred embodiment, the network interface card 250 in the client computer system 124 is adapted to the particular network in which the client computer is being installed. For example, if the client computer 124 is being installed in a network using the Ethernet topology, the network interface card 250 is an Ethernet network interface card. If the client computer 124 is being installed in a network that uses a Token Ring topology, the network interface card 250 is a Token Ring network interface card. The client computer system 124 also preferably includes a configuration file that comprises the frame types that are appropriate for the network interface card installed in the computer system. For example, if the client computer 124 is to be inserted into an Ethernet network, and the network interface card is an Ethernet card, the configuration file will comprise the four Ethernet frame types, these being Ethernet II, the IEEE 802.3 "raw" the IEEE 802.2, and the IEEE 802.2 SNAP frame types. If the client computer 124 is being installed in a Token Ring network and the network interface card 250 is a Token Ring card, then the configuration file will include the two Token Ring frame types, these being the IEEE 802.2 and the IEEE 802.2 SNAP frame types.

The client computer system 124 also preferably includes a network service detection method according to the present invention for determining the prevalence of network operating systems and network frame types being used on the network to which the client computer is attached. In the preferred embodiment the method determines this prevalence and then automatically configures the computer system 124 according to the most prevalent network operating system and frame type being used in the network. In the following discussion, the method of the preferred embodiment is referred to either as a network service detection method or a network configuration method.

Referring now to FIGS. 3A–3F, a flowchart diagram illustrating operation of the network configuration method according to the preferred embodiment of the present invention is shown. The specification also includes a program listing of source code which implements the preferred embodiment of the present invention. This source code listing is included at the end of the detailed description. After startup, i.e. power on of the computer system, in step 302 a "Getting Started" menu appears on the video screen of the computer 124, as shown in FIG. 4A. As shown in FIG. 4A, the menu selection includes various options for making spare diskettes, displaying a manufacturing test report, exiting to either Windows or MS-DOS, or running the network setup program which implements the methods of the present invention. If the user selects any of the various options other than the "Run Network Setup Program" option in step 304, then the computer system 124 processes the other selection in step 306.

If the user selects the "Run Network Setup Program" option in step 304, then in step 310 the computer system 124 loads an ODI (open data-link interface) link support layer. The ODI link support layer is loaded to allow software in the client computer 124 to talk to the network interface card driver. In step 312 the ODI driver for the network interface card 250 is loaded. During this load process, the device driver reads the configuration file that contains the frame types appropriate for the respective network interface card 250 installed in the client computer 124. The device driver operates to split the network interface card into separate logical cards or boards according to the respective frame types in the configuration file. Thus, if four Ethernet frame types are defined in the configuration file, the driver essentially initializes four different logical cards. Alternatively, if the network interface card is a Token Ring card, the device driver initializes two different logical cards for each of the two respective Token Ring frame types. The network interface card driver and frame types in the configuration file essentially inform the configuration software whether the client computer 124 is being installed in an Ethernet network or a Token Ring network. Also, during this step the network configuration method of the present invention registers itself with the device driver and sets itself as the default protocol stack for all available logical cards. In other words, the method of the present invention binds itself to the various logical cards to facilitate the various broadcast inquiries made later according to the present invention.

Figure 4A:
FIGS. 4A–M are various screen displays illustrating operation of the automatic network configuration method according to the preferred embodiment of the present invention.
Figure 4B:
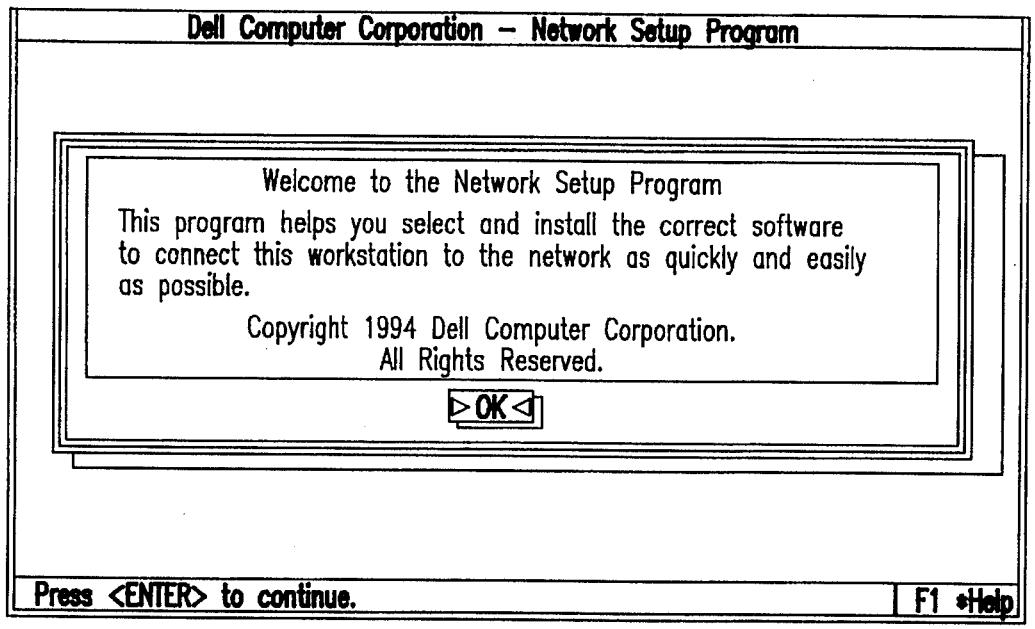
Figure 4C:
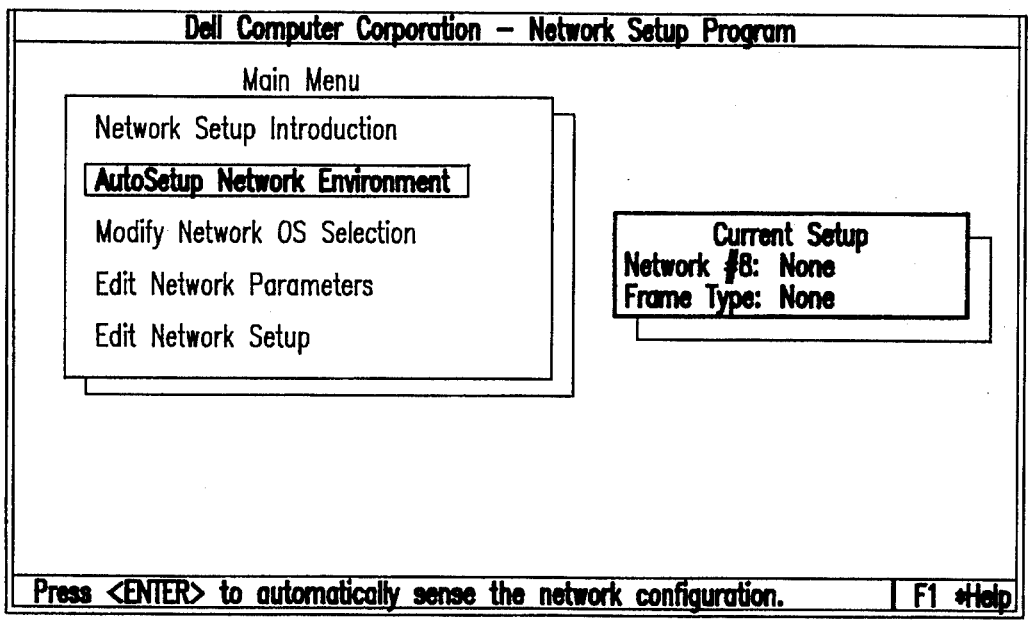
Figure 4D:
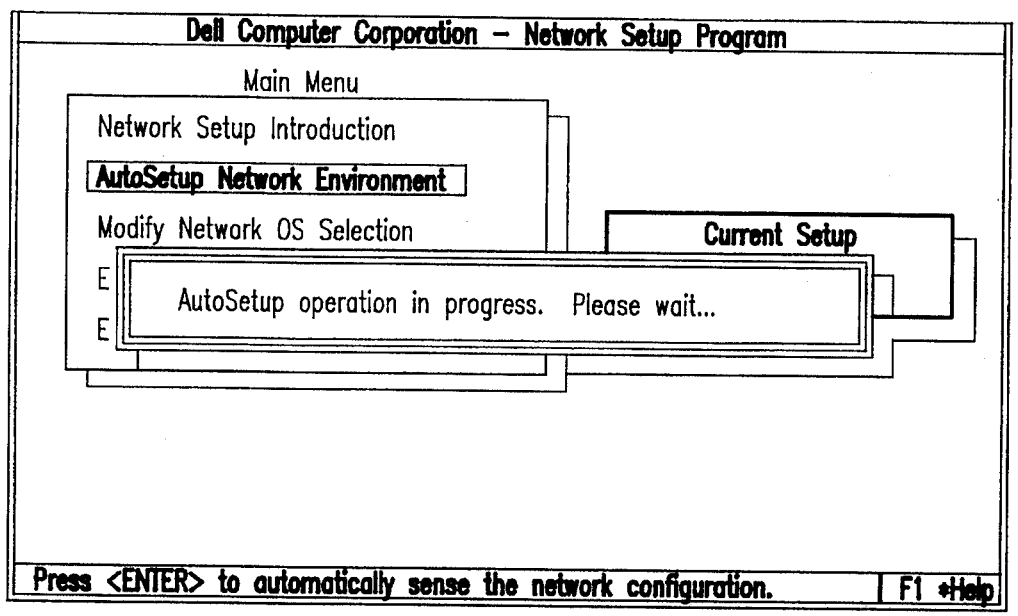

In step 314 the computer system 124 displays the main menu for the Network Setup Program. As shown in FIG. 4B, the method first displays a welcome screen providing the user with information about the Network Setup Program. The Network Setup Program Main Menu is illustrated in FIG. 4C. As shown, the menu includes options for "Network Setup Introduction", "Autosetup Network Environment", "Modify Network OS Selection", "Edit Network Parameters", and "Edit Network Setup". The computer 124 also displays the "Current Setup" for the network OS and frame type. As shown in FIG. 4C, at the very first power up of the computer system 124, the current setup for OS and frame type will be "None" for each. If the user selects any of the various options other than the "Autosetup Network Environment" option in step 316, then the computer system 124 processes this other selection in step 318. If the user selects the "Autosetup Network Environment" option in step 316, then in step 320 the automatic network configuration method of the present invention is invoked. As shown in FIG. 4D, a message appears on the video screen stating: "Autosetup operation in progress. Please wait . . . ". As discussed below, the present invention operates by broadcasting various network operating system-specific service inquiries for various network operating systems and frame types.

If the client computer 124 is being installed in a network using an Ethernet topology, then in step 322 (FIG. 3B) the client computer 124 broadcasts a VINES ARP (Address Resolution Packet) inquiry using an Ethernet II frame type out across the network. In step 324 the client computer 124 receives any responses from other nodes on the network. In step 326 these responses are added to an internal table referred to as the network configuration table maintained by the configuration method of the present invention, which is essentially used to tabulate or tally the responses. This table is illustrated in FIG. 5. These steps of broadcasting the ARP inquiry using the Ethernet II frame type, receiving any response and adding the response to the table are performed three times as shown.

When the above sequence has been performed three times, then in step 332 (FIG. 3C) the client computer 124 broadcasts a NetWare SAP (Service Advertising Protocol) inquiry using an Ethernet II frame type across the network. In step 334 the client computer 124 broadcasts a NetWare SAP inquiry using an 802.3 "raw" frame type onto the network. In step 336 the computer 124 broadcasts a NetWare SAP inquiry using an 802.2 frame type onto the network. In step 338 the computer 124 broadcasts a NetWare SAP inquiry using an 802.2 SNAP frame type onto the network. In step 340 the client computer 124 receives any responses from the network and adds these responses to the table (FIG. 5) in step 342. Steps 332–342 are performed three times. When this has completed, the client computer 124 performs broadcast inquiries for other network operating system types, as desired. For example, in an alternative embodiment of the invention, the client computer 124 also performs broadcast inquiries for the LAN Server and LAN Manager operating systems. Broadcast inquiries for other network operating systems are also contemplated. However, in the preferred embodiment, only broadcast inquiries for the Banyan VINES and Novell NetWare operating systems are performed. When the broadcast inquiries for all respective operating systems have been performed, the client computer 124 then advances operation to step 380 in FIG. 3D.

Figure 3A:
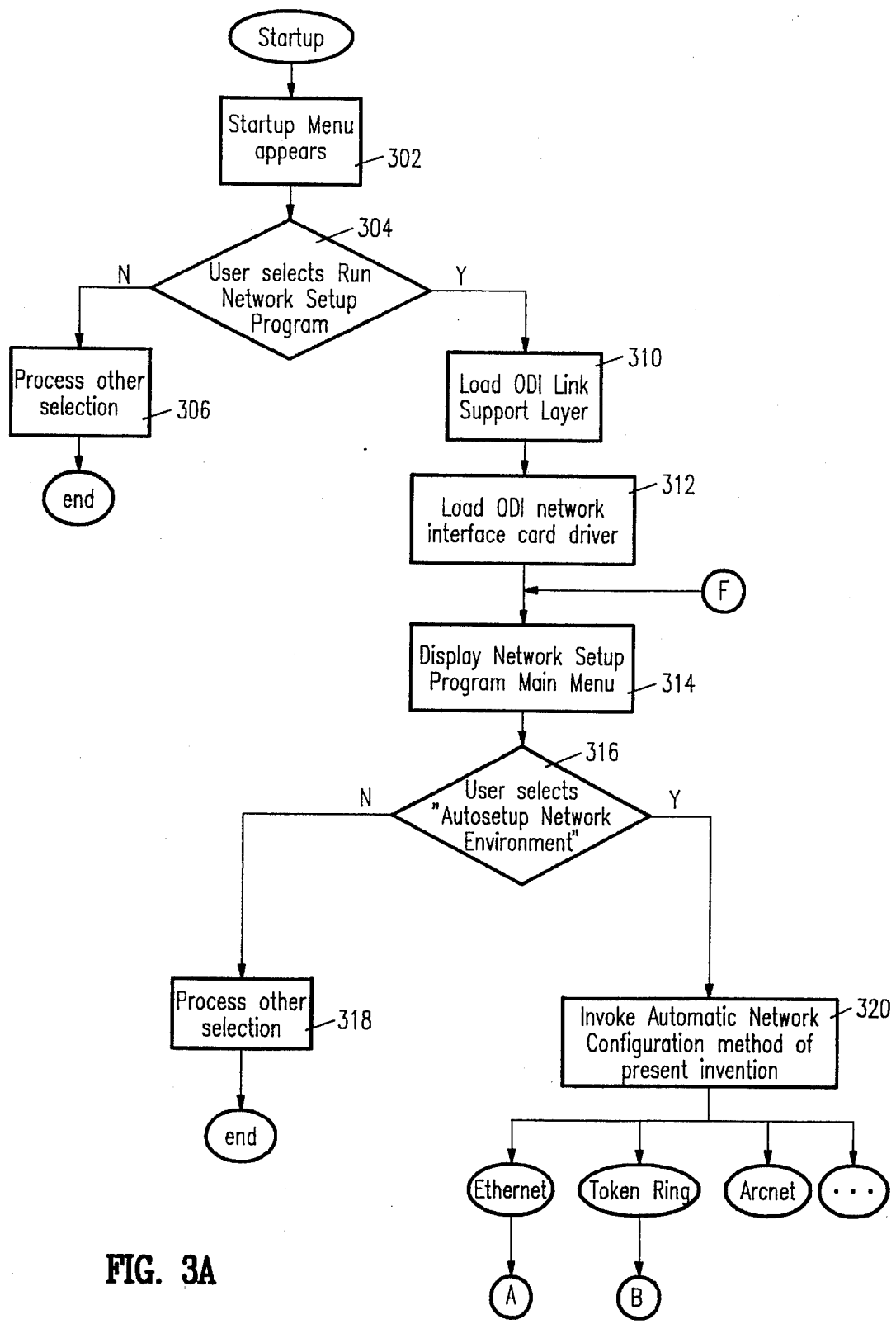
FIGS. 3A–F are flowchart diagrams illustrating operation of the automatic network configuration method according to the preferred embodiment of the present invention.
Figure 3B:
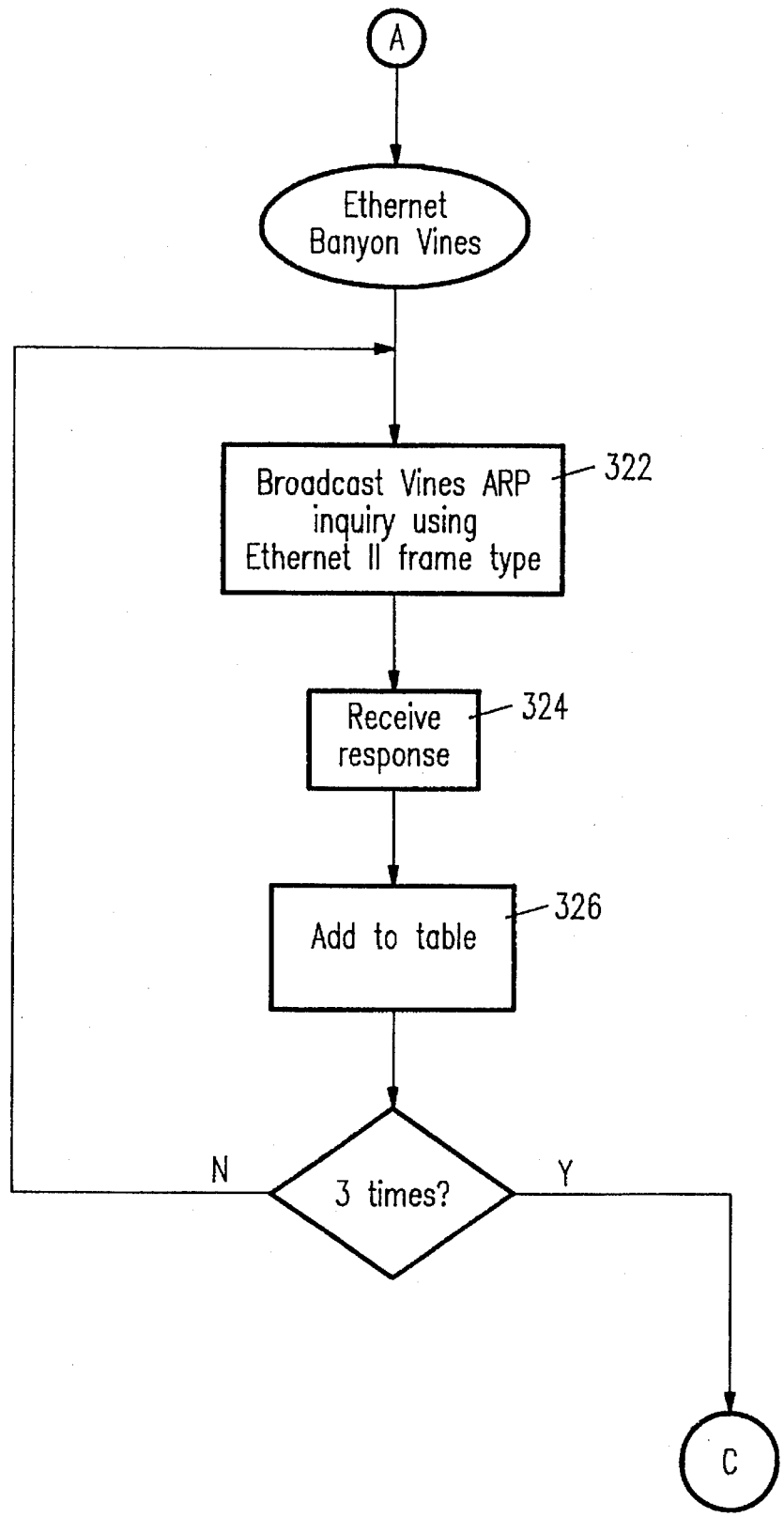
Figure 3C:
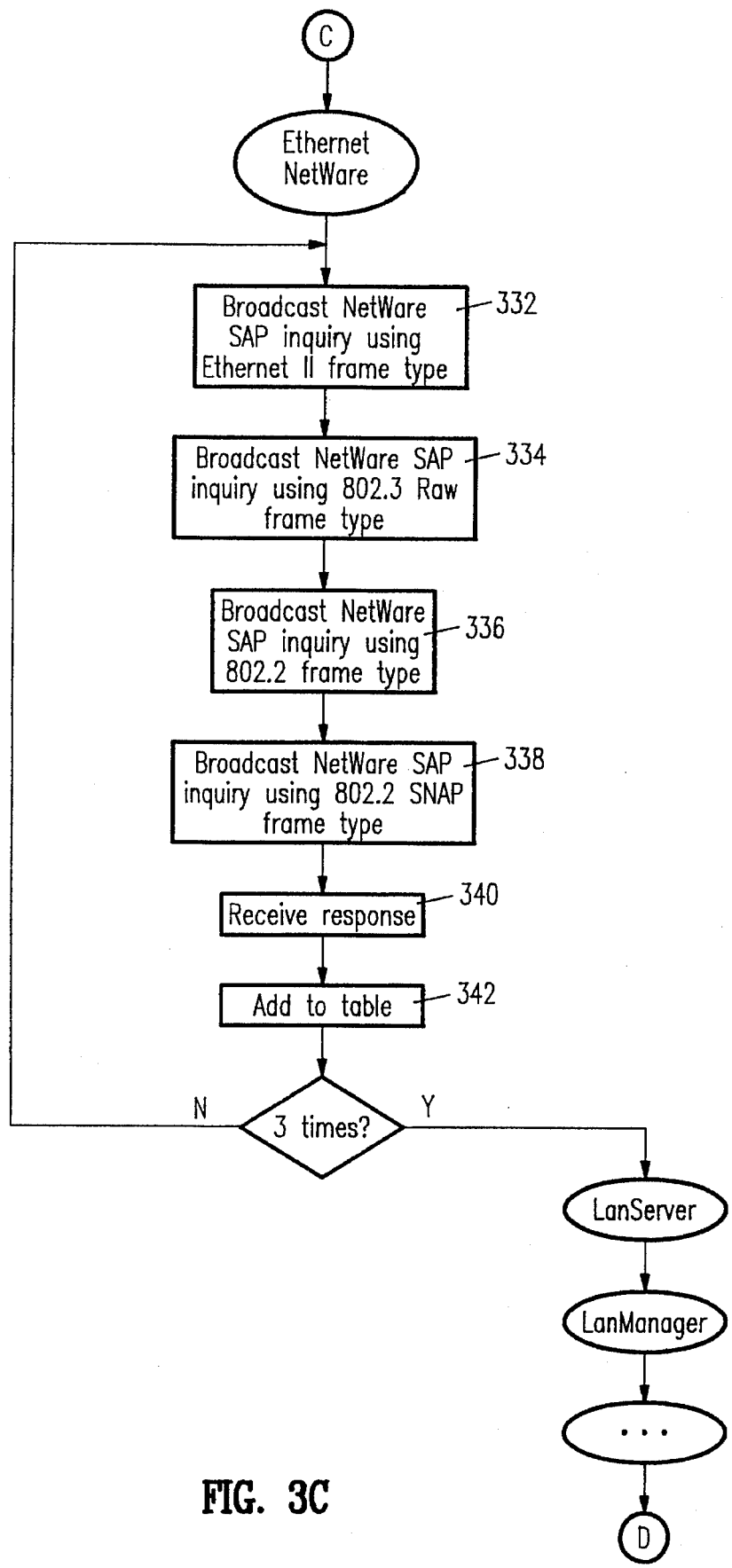
Figure 3D:
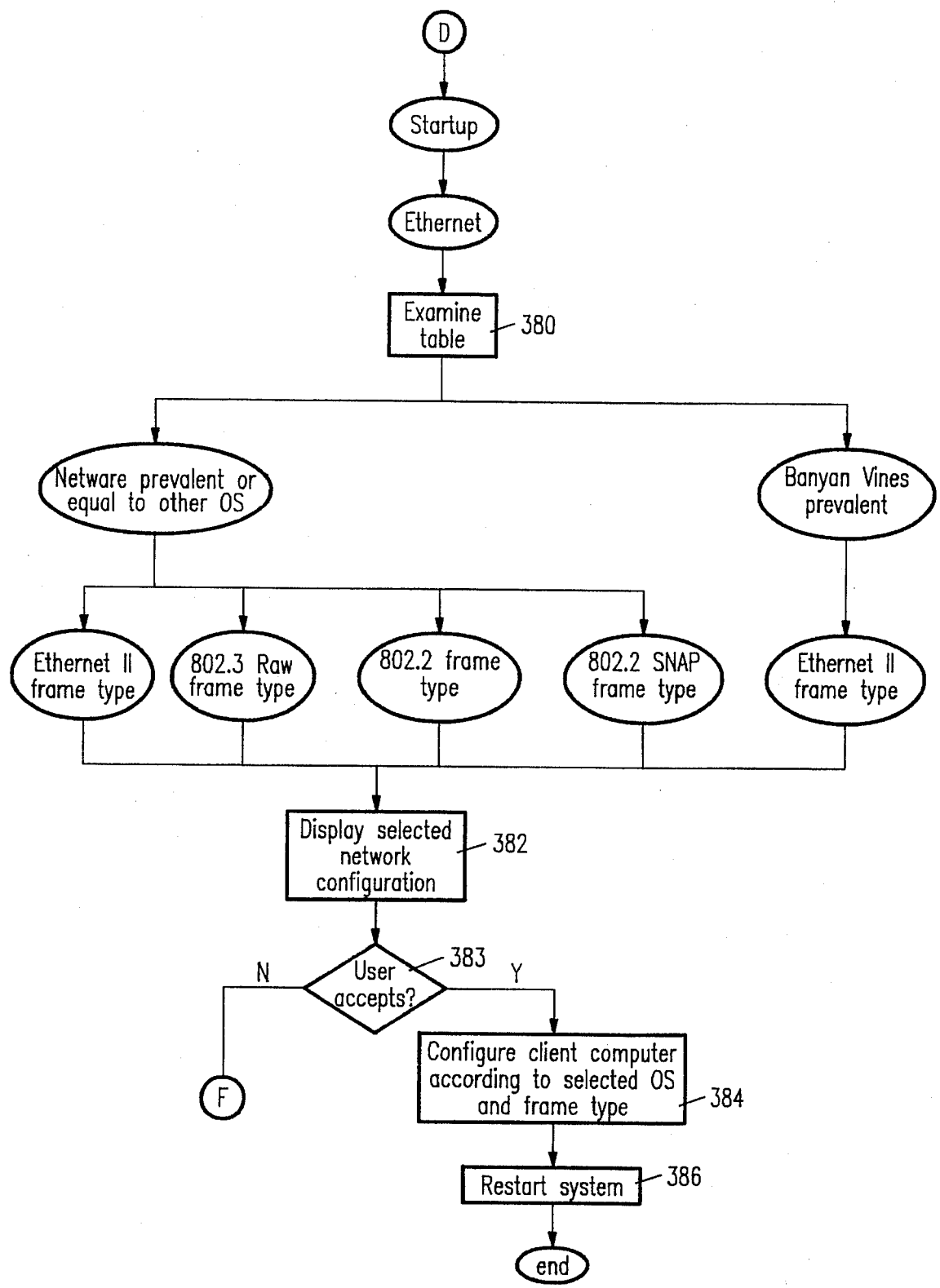

Referring now to FIG. 3D, once the client computer 124 has performed all of the various broadcast inquiries to determine the prevalence of network operating systems and frame types on a network using the Ethernet topology, in step 380 the client computer 124 examines the network configuration table generated. As shown in FIG. 5, the table includes columns for each of the network operating systems detected in the preferred embodiment, these being NetWare and VINES. The network configuration table also includes rows for each of the different Ethernet frame types broadcast in step 322 and in steps 332–338. These include the Ethernet II frame type, the Ethernet 802.3 "raw" frame type, the Ethernet 802.2 frame type, and the Ethernet 802.2 SNAP frame type. As shown, the table also includes row entries for two Token Ring frame types which are only used if the computer 124 is being installed in a network using a Token Ring topology. In an alternative embodiment, the table includes rows and columns for other network frame types and other network operating systems, respectively, as desired.

Referring again to FIG. 3D, after examination of the table in step 380, the client computer 124 determines the most prevalent operating system and frame type. If the NetWare operating system has the most responses, or has the same number of responses as the next most prevalent operating system, then in the preferred embodiment the NetWare operating system is determined to be the most prevalent operating system on the network. Referring now to FIG. 5A, one example of the table in FIG. 5 is shown after the various responses to the broadcast queries made in steps 322 and 332–338 have been received and tallied. It is noted that the table illustrated in FIG. 5A is one example of the operation of the method of the present invention for a particular network configuration. As shown, in this particular configuration the client computer 124 received 15 responses to the NetWare Ethernet II frame type broadcast inquiry and received three responses to the VINES Ethernet 802.3 II frame type broadcast inquiry. Thus, when the table is examined in step 380, the client computer 124 will determine that the NetWare OS and the II frame type are the most prevalent.

Figure 4E:
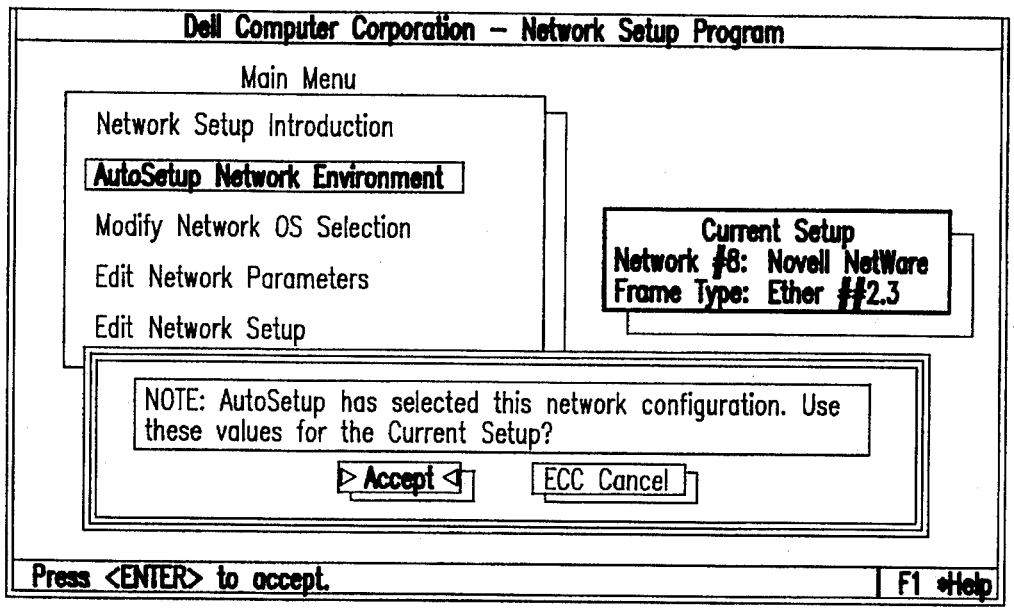

Upon determining the most prevalent operating system and frame type, the client computer 124 then displays the selected network configuration in step 382, as shown in FIG. 4E. Using the example illustrated in FIG. 5A, the screen display in FIG. 4E shows the selected network configuration to be the Novell NetWare operating system and the Ethernet 802.3 frame type. The computer system 124 also displays a dialog box asking the user if the displayed values should be used for the network configuration. If the user does not accept the displayed network configuration in step 383, control returns to step 314 (FIG. 3A), and the Network Setup Program Main Menu is displayed. If the user accepts the displayed network configuration in step 383, then in step 384 the client computer 124 configures itself according to the selected OS and frame type.

Therefore, the client computer 124 configures itself according to the most prevalent operating system using the most prevalent frame type determined from the network configuration table in FIG. 5. If the NetWare OS and Ethernet II frame type are determined to be the most prevalent, then the computer system 124 configures itself according to the NetWare OS and Ethernet II frame type. If the NetWare OS and Ethernet 802.3 "raw" frame type are determined to be the most prevalent, then the computer system 124 configures itself according to the NetWare OS and the Ethernet 802.3 "raw" frame type. If the NetWare OS and Ethernet 802.2 frame type are determined to be the most prevalent, then the computer system 124 configures itself according to the NetWare OS and the Ethernet 802.2 frame type. If the NetWare OS and Ethernet 802.2 SNAP frame type are determined to be the most prevalent, then the computer system 124 configures itself according to the NetWare OS and the Ethernet 802.2 SNAP frame type. If the VINES operating system is determined to be the most prevalent, then the client computer 124 configures itself according to the VINES operating system using the Ethernet II frame type.

The computer system 124 configures itself by modifying a configuration file to change the appropriate subdirectories so that the appropriate network operating system software is loaded at power up. In the preferred embodiment in a Windows/DOS environment, the computer system 124 modifies the autoexec.bat file so that the appropriate network operating software is loaded at power up. The computer system 124 also modifies the network operating system configuration files to use the frame type determined to be the most prevalent.

Figure 4F:
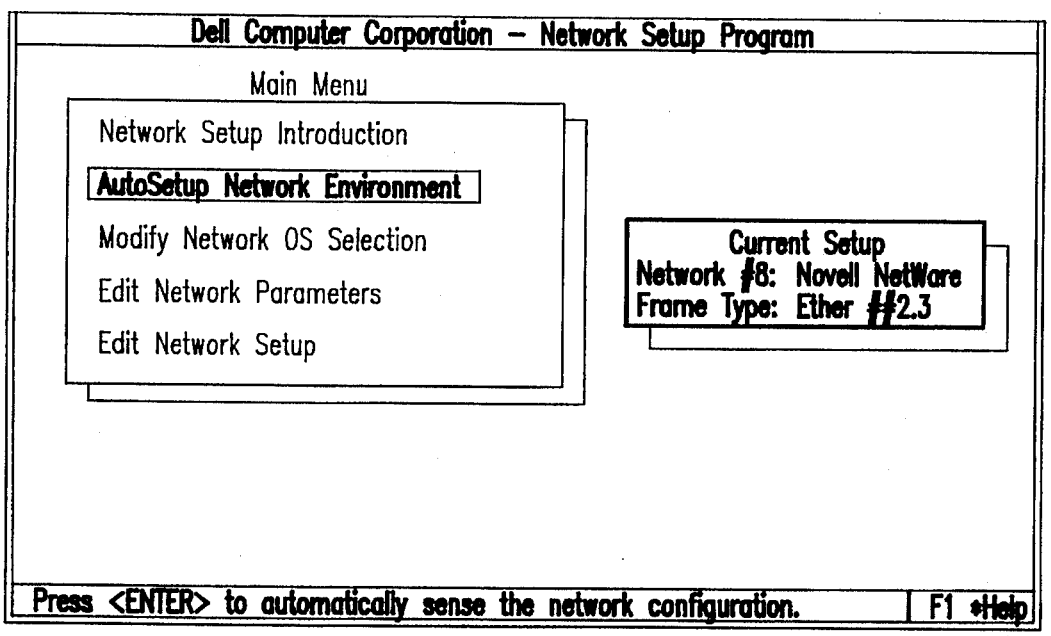
Figure 4G:
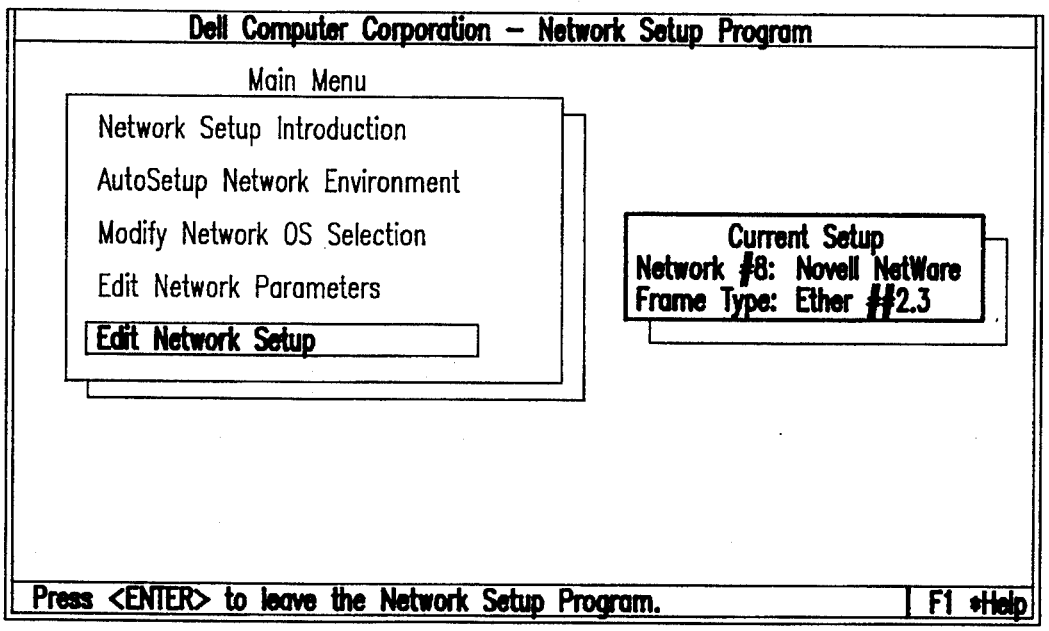
Figure 4H:
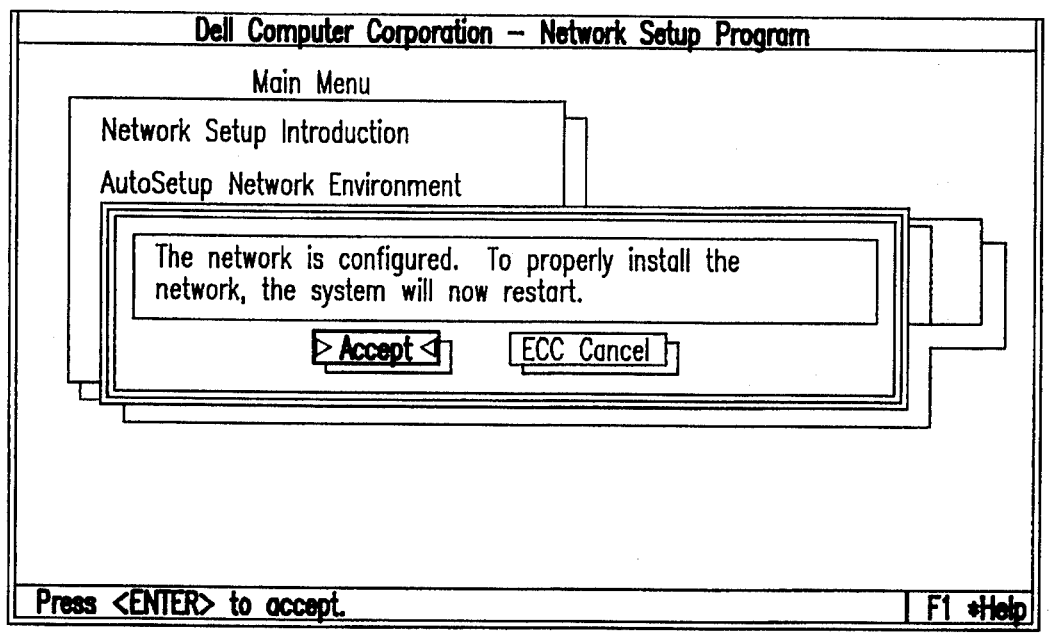
Figure 4I:
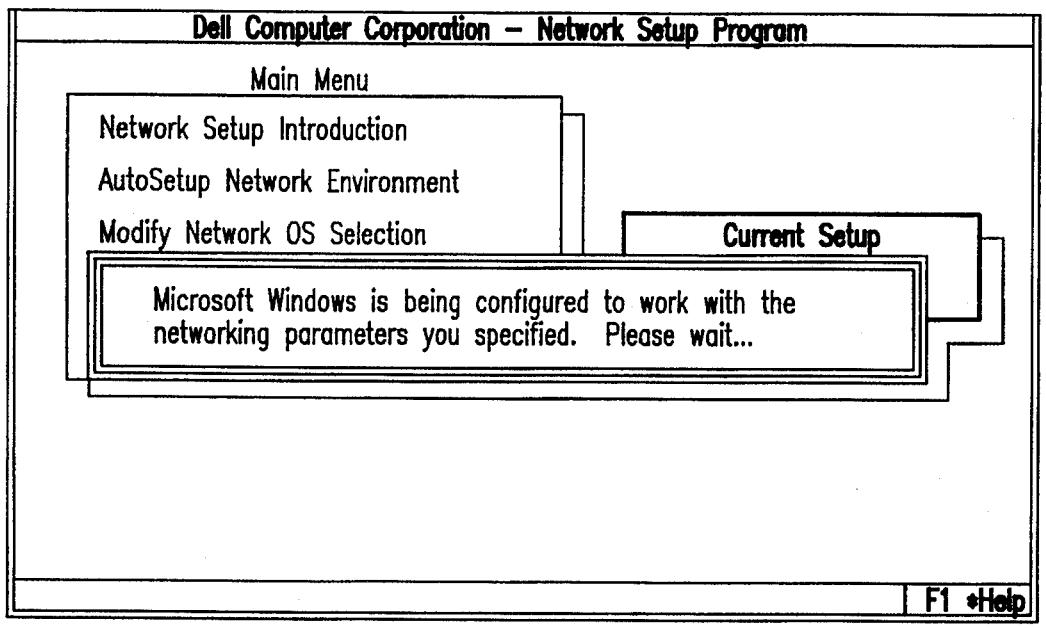

After the user accepts the displayed configuration in step 383 and the client computer 124 has configured itself to the most prevalent operating system and frame type in step 384, the computer system 124 displays the Network Setup Program Main Menu along with the current network setup, as shown in FIG. 4F. The user may then select the "Exit Network Setup" option, as shown in FIG. 4G, and a dialog box appears stating that the network is configured and that the system will restart to properly install the network, as shown in FIG. 4H. If the user chooses the "Accept" option in FIG. 4H, the computer system restarts in step 386, and a dialog box appears informing the user that the client computer 124 is being configured to work with the specified network parameters, as shown in FIG. 4I. In the preferred embodiment, during this time the method of the present invention also updates the Microsoft Windows configuration files to reflect the network operating system being used. After the computer system 124 reboots, the computer 124 will be configured with the most prevalent network operating system software and frame type being used in the network.

Figure 3E:
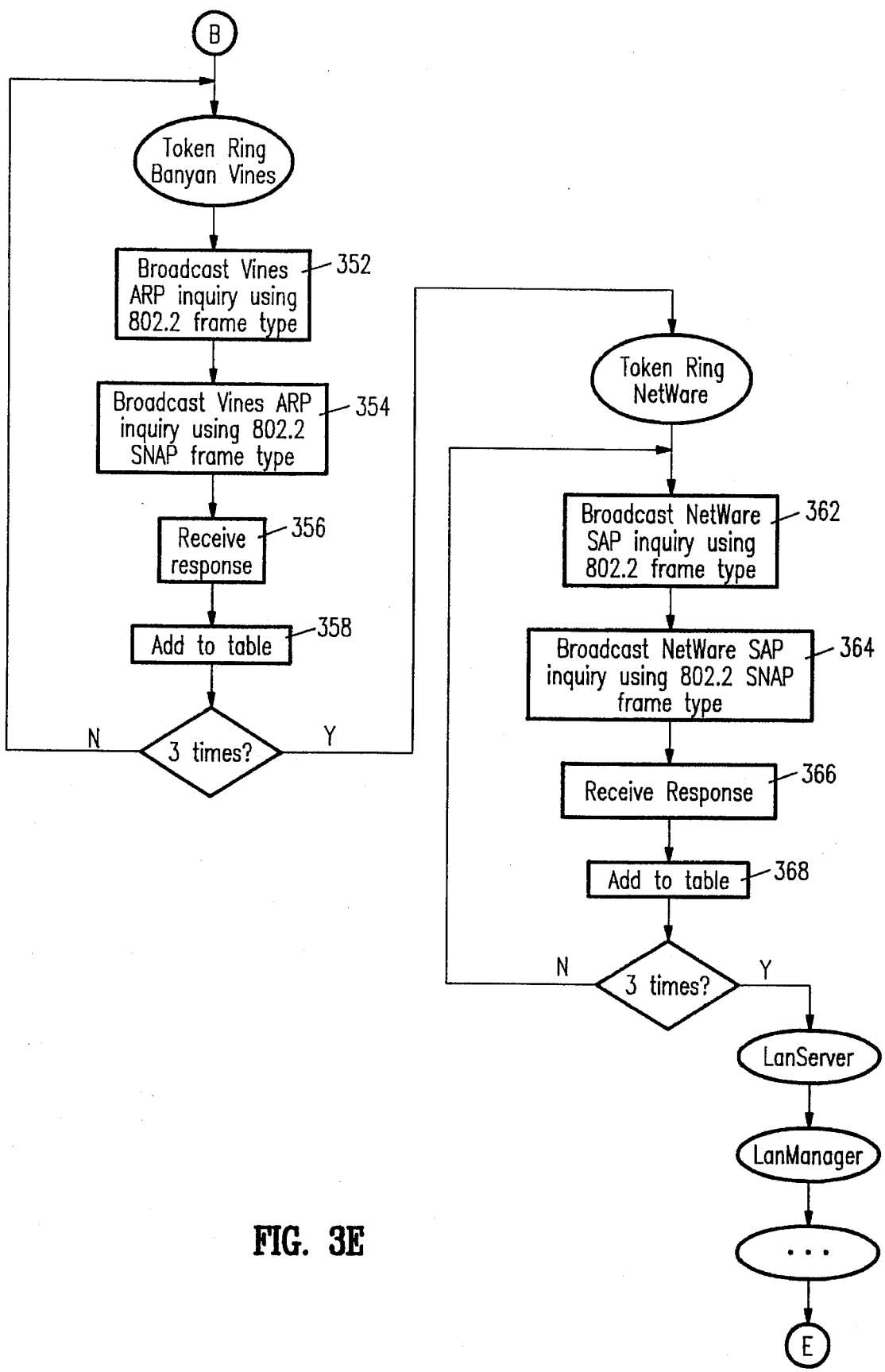

Referring again to FIG. 3A, if the client computer 124 is being installed in a network that uses a Token Ring topology, then the steps illustrated in FIG. 3E are performed. Referring now to FIG. 3E, in step 352 the client computer 124 broadcasts a VINES Address Resolution Packet (ARP) inquiry using an 802.2 frame packet onto the network. In step 354 the client computer 124 broadcasts a VINES ARP inquiry using an 802.2 SNAP frame packet onto the network. In step 356 the client computer 124 receives any response from the network and adds these responses to the network configuration table (FIG. 5) in step 358. Steps 352–358 are performed three times, as shown. When this operation has completed, the client computer 124 then performs NetWare operating system broadcast inquiries. In step 362 the client computer 124 broadcasts a NetWare SAP inquiry using an 802.2 frame packet onto the network. In step 364 the client computer 124 broadcasts a NetWare SAP inquiry using an 802.2 SNAP frame packet onto the network. In step 366 the client computer 124 receives any response from the network and in step 368 the computer 124 adds these responses to the network configuration table. As before, steps 362–368 are performed three times. When this operation has completed, the client computer 124 then performs broadcast inquiries for other network operating system types, as desired. In an alternative embodiment of the invention, the client computer 124 also performs broadcast inquiries for the LAN Server and LAN Manager operating systems, among others.

Figure 3F:
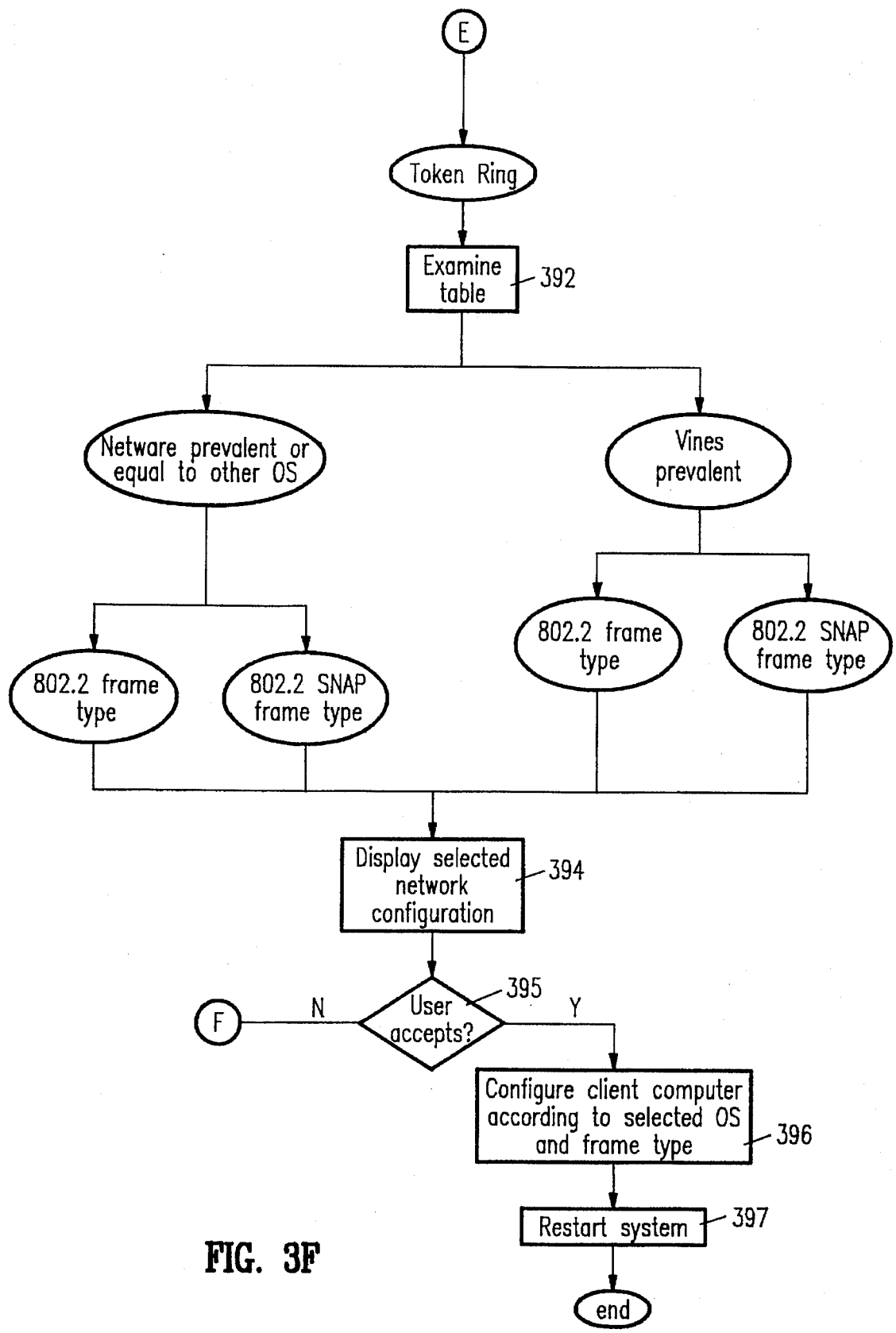

As shown in FIG. 3F, once the client computer has performed all of the desired broadcast inquiries, received the respective responses, and tallied the responses in the network configuration table, in step 392 the client computer 124 examines the table (FIG. 5) generated by these broadcasts. As shown in FIG. 5, the table includes columns for the respective network operating systems, these being NetWare and VINES, and includes rows for each of the different Token Ring frame types. These include the Token Ring 802.2 frame type and the Token Ring 802.2 SNAP frame type. As shown, the table also includes entries for four Ethernet frame types which are only used if the computer 124 is being installed in a network using an Ethernet topology, as described above. In an alternative embodiment, the table includes rows and columns for other network frame types and other network operating systems, respectively, as desired.

Referring again to FIG. 3F, as shown the NetWare operating system is deemed the most prevalent if the number of entries in the table for NetWare are greater than or equal to the next highest number for any other operating system. Referring now to FIG. 5B, one example of the network configuration table in FIG. 5 is shown after the various responses to the broadcast queries made in steps 322 and 332–338 have been received and tallied. It is noted that the table illustrated in FIG. 5B is one example of the operation of the method of the present invention for a particular network configuration. As shown, in this particular configuration the client computer 124 received nine responses to the VINES Token Ring 802.2 frame type broadcast inquiry and received three responses to the VINES Token Ring 802.2 SNAP frame type broadcast inquiry. Thus, when the table is examined in step 392, the client computer 124 will determine that the VINES OS and the Token Ring 802.2 frame type are the most prevalent.

Upon determining the most prevalent operating system and frame type, the client computer 124 then displays the selected network configuration in step 394. The screen generates a display similar to that shown in FIG. 4E, except that the Current Setup will show the most prevalent network OS and frame type found in the Token Ring environment. In the example illustrated in FIG. 5B, the Current Setup will be the VINES OS and the Token Ring 802.2 frame type. If the user does not accept this configuration in step 395, then control returns to step 314 in FIG. 3A, and the Network Setup Program Main Menu is displayed. If the user does accept this configuration, then in step 396 the client computer 124 configures itself according to this configuration.

Therefore, as before, the client computer configures itself according to the most prevalent operating system and frame type determined from the network configuration table of FIG. 5. If the NetWare OS and the Token Ring 802.2 frame type are determined to be the most prevalent, then the computer system 124 configures itself according to the NetWare OS and Token Ring 802.2 frame type. If the NetWare OS and the Token Ring 802.2 SNAP frame type are determined to be the most prevalent, then the computer system 124 configures itself according to the NetWare OS and Token Ring 802.2 SNAP frame type. If the VINES operating system and the Token Ring 802.2 frame type are deemed the most prevalent, then the computer system 124 configures itself according to the VINES OS and the Token Ring 802.2 frame type. If the VINES OS and the Token Ring 802.2 SNAP frame type are deemed the most prevalent, then the client computer 124 configures itself according to the VINES operating system and the 802.2 SNAP frame type.

As discussed above, the computer system 124 configures itself by modifying the configuration file, i.e., the autoexec.bat file, to change the appropriate subdirectories so that the appropriate network operating system software is loaded at power up. The computer system 124 also modifies the network operating system configuration files to use the most prevalent frame type. After the user accepts the displayed configuration in step 395 (FIG. 3F) and the client computer 124 has configured itself to the most prevalent operating system and frame type in step 396, the computer system 124 displays the Network Setup Program Main Menu along with the current network setup. The screen display that appears is similar to that shown in FIG. 4F, except that the Current Setup will reflect the configuration determined in the Token Ring environment. The user may then select the "Exit Network Setup" option, as shown in FIG. 4G, and a dialog box appears stating that the network is configured and that the system will restart to properly install the network, as shown in FIG. 4H. If the user chooses the "Accept" option in FIG. 4H, the computer system restarts in step 397, and a dialog box appears informing the user that the client computer 124 is being configured to work with the specified network parameters, as shown in FIG. 4I. In the preferred embodiment, during this time the method of the present invention also preferably updates the Microsoft Windows configuration files to reflect the network operating system being used. After the computer system 124 reboots, the computer 124 will be configured with the most prevalent network operating system software and frame type being used in the network.

Figure 4J:
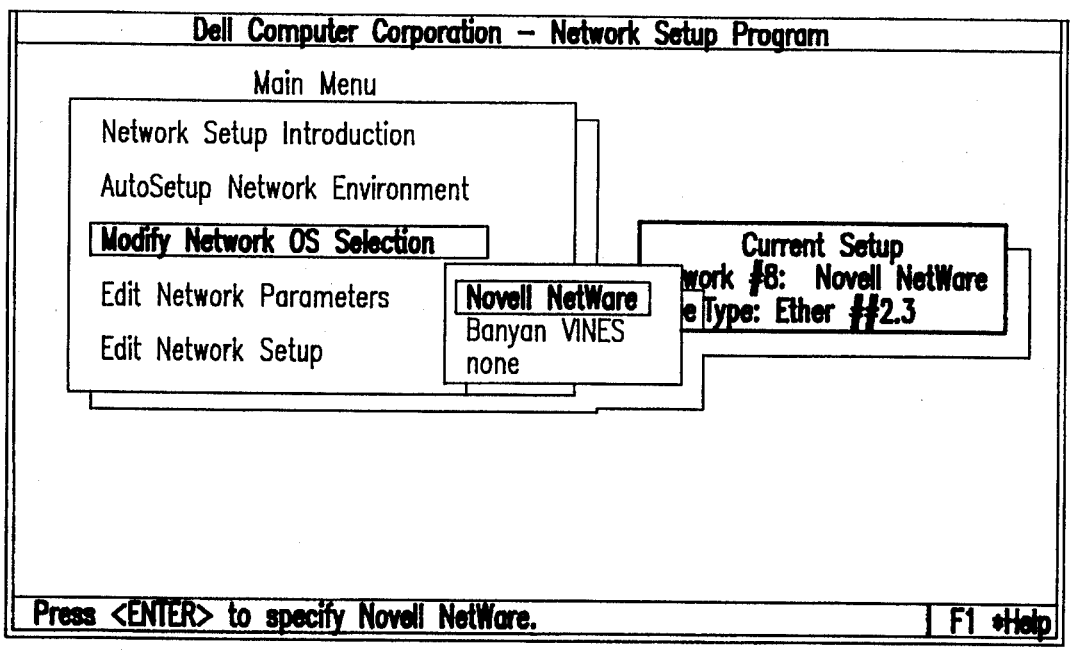
Figure 4K:
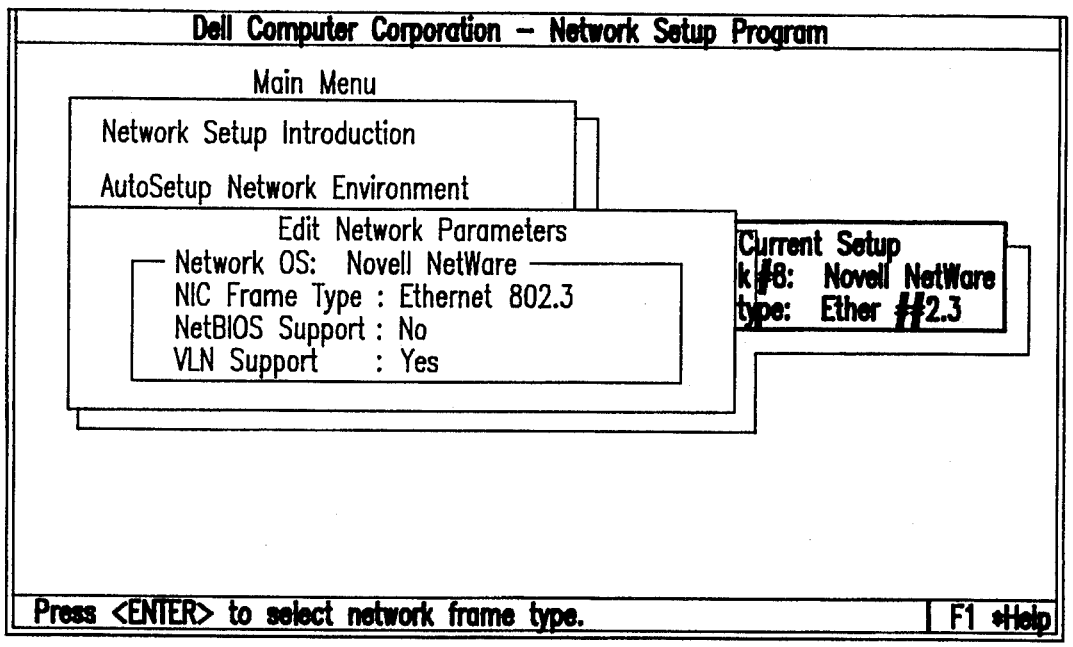
Figure 4L:
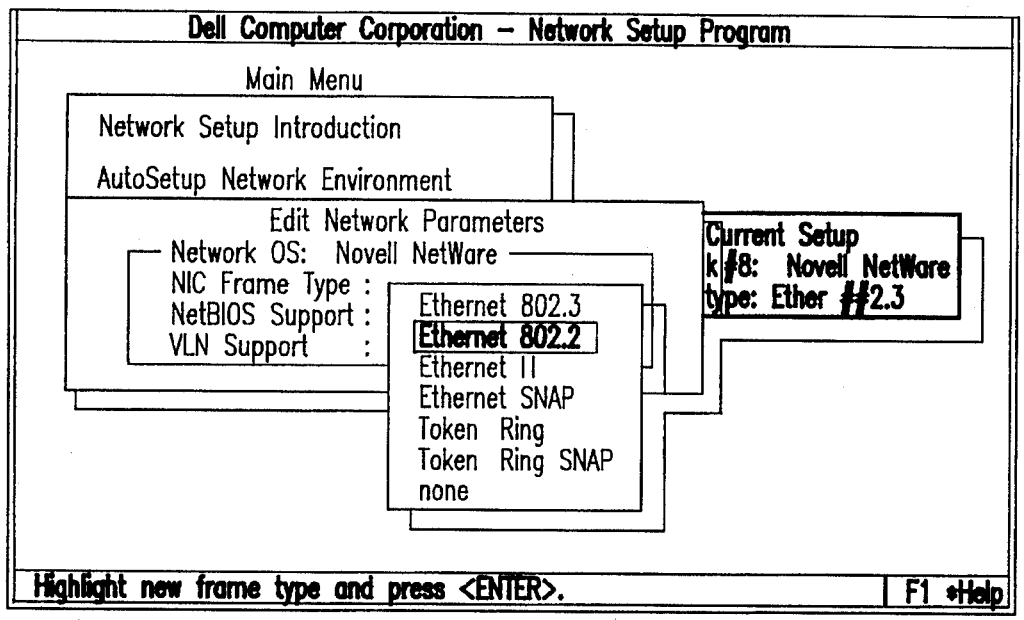
Figure 4M:
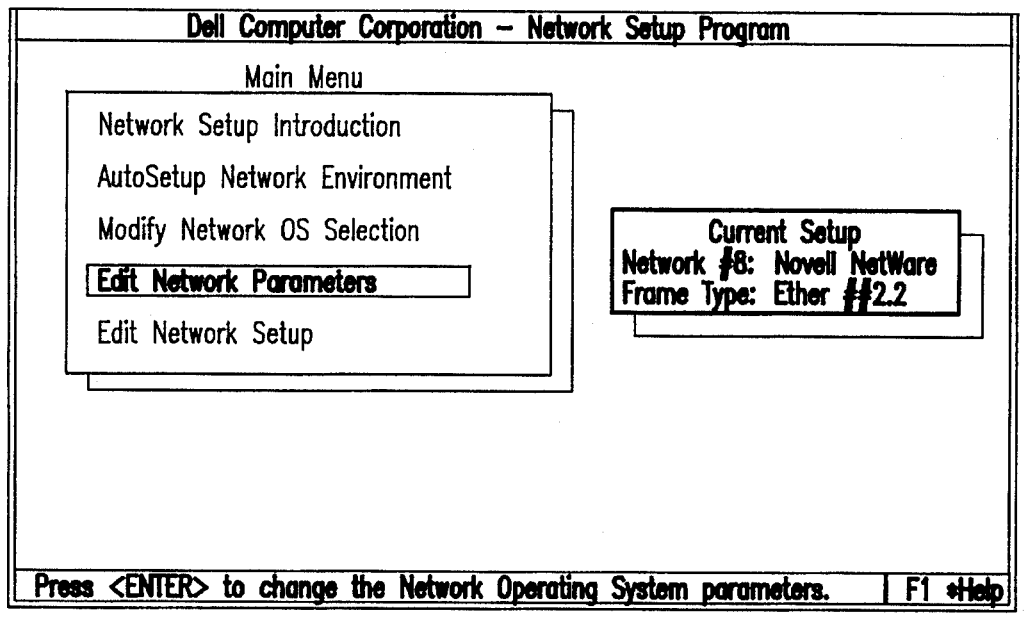

Referring again to FIG. 3A, as discussed above, if the user selects an option other than "Run Network Setup Program" in step 304, this other selection is processed in step 306. Referring now to FIG. 4J, if the user selects the "Modify Network OS Selection" option from the Network Setup Program Main Menu, then a dialog box appears which displays the operating system software available. In the preferred embodiment, only Novell NetWare and Banyan VINES are available. The user may then modify the network OS selection as desired. If the user selects the "Edit Network Parameters" option from the Main Menu, then the screen appears as shown in FIG. 4K. As shown, a dialog box appears informing the user of the network OS, network interface card (NIC) frame type, NetBIOS support, and VLM (Virtual Loadable Module) Support. As is well known, NetBIOS is a network communication protocol and VLM is a NetWare DOS requester. If the user elects to select a new network frame type, then the screen illustrated in FIG. 4L appears. As shown, the user can select from various frame types, including Ethernet 802.3, Ethernet 802.2, Ethernet II, Ethernet SNAP, Token Ring, Token Ring SNAP, or none. If the user selects the Ethernet 802.2 frame type in FIG. 4L, then the current setup changes as shown in FIG. 4M.

Broadcast Inquiry Details

As discussed above, in the preferred embodiment the present invention operates by broadcasting certain network operating system requests or inquiries for each of the possible network operating systems and frame types that might be available, tallying the responses in a network configuration table, and then examining the table to determine the most prevalent operating system and frame type used in the network. The following discussion describes the structure for the respective broadcast requests or inquiries used in the preferred embodiment to query the network for the Novell NetWare and Banyan VINES operating systems and the respective frame types used by these operating systems. For more information on these broadcast inquiries please see the source code listing at the end of this description. Also, it is noted that the present invention may broadcast inquiries for other operating systems and other frame types, as desired.

Referring now to FIG. 6, the various layers comprising the open systems interconnection (OSI) model is shown. As shown, data transfers on networks can be modelled as including seven layers, these layers comprising a physical layer, data link layer, network layer, transport layer, session layer, presentation layer, and application layer. As shown, the physical layer includes the network interface card and handles the physical signalling on the network, including connectors, timing voltages and other matters. The second layer, the data link layer, is responsible for the transfer of data over the link or network. The network layer is responsible for addressing and routing between subnetworks. The transport layer ensures end to end, error free delivery. The session layer coordinates the interaction between end application programs. The presentation layer provides for the representation of the data. The application layer is concerned with the support of end user application processes.

Figure 7:
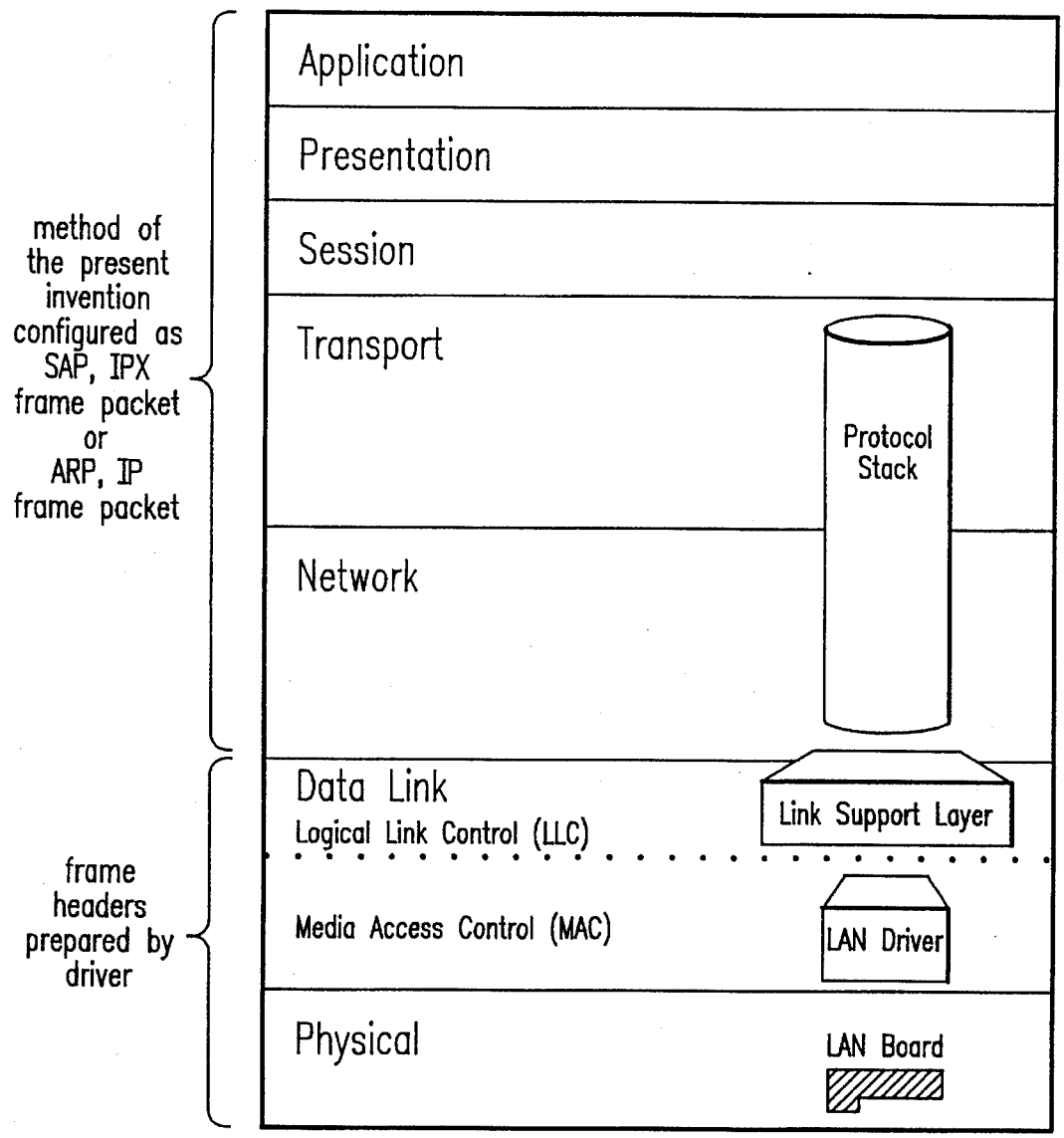
FIG. 7 illustrates the configuration of frame packets according to the OSI model of FIG. 6.

Referring now to FIG. 7, a diagram illustrates the automatic network configuration method in relation to the OSI reference model of data communications. The method of the present invention provides the application, presentation, session, transport, and network layers. The method of the present invention builds the respective broadcast query frame packets or inquiries for each operating system and each frame type within that operating system. The data link and physical layers are provided by the link support layer program and the network interface card driver. The network interface card driver prepends the appropriate frame headers to the frame packets and transmits them onto the physical network.

Figure 8:
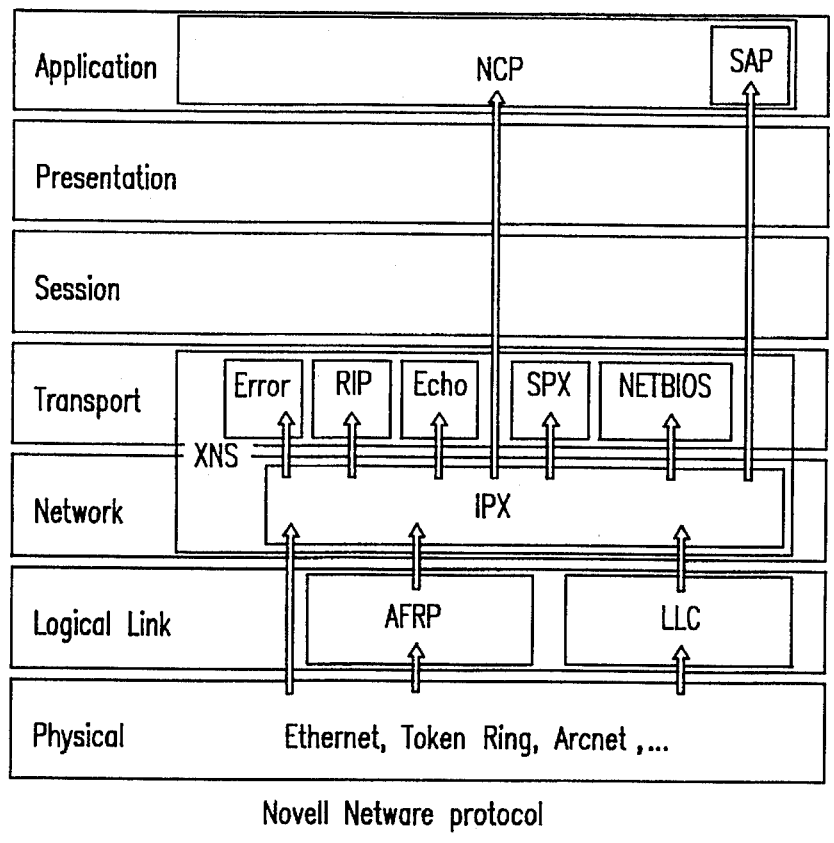
FIG. 8 illustrates the data transfer protocol for the Novell NetWare operating system.

FIG. 8 illustrates the protocol used by the Novell NetWare operating system in reference to the OSI reference model of data communications illustrated in FIG. 6 discussed above. As shown, the application layer of the Novell NetWare operating system protocol includes a NetWare core protocol (NCP), which is Novell's application level protocol for the exchange of commands and data between file servers and workstations. This protocol is also known as the NetWare file service protocol (NFSP). The application level also includes a protocol referred to as the Service Advertising Protocol (SAP). The Service Advertising Protocol is used by NetWare servers to broadcast the names and location of servers and to send a specific response to any station that requests it. As discussed further below, this protocol is used by the automatic network service detection method of the present invention to aid in determining the prevalence of operating systems and frame types. NetWare supports the emulation of NetBIOS (Network Basic I/O System), which is the protocol implemented by the IBM PC LAN program to support communication between symbolically named stations and the exchange of arbitrary data. NetWare also includes a family of protocols derived from the Xerox Network Systems protocols (XNS). This family of protocols includes the Sequential Packet eXchange protocol (SPX), Internetwork Package Exchange (IPX), Routing Information Protocol (RIP), Echo and Error. The SPX protocol is Novell's version of the Xerox transport level protocol called SPP. The IPX protocol is a network level protocol which corresponds to the Xerox IDP protocol. The RIP protocol is Novell's version of a protocol used to exchange routing information among gateways. Echo is a request/response protocol used to verify the existence of a host. Error is a protocol by which a station reports that it has received and is discarding a defective packet.

In the preferred embodiment, the automatic network configuration method of the present invention utilizes NetWare's SAP (Service Advertising Protocol) running over NetWare's IPX (Internetwork Packet exchange protocol) to determine the prevalence of NetWare operating systems and the use of frame types on a network. NetWare's Service Advertising Protocol allows servers running on NetWare to advertise their services by name, service type, and internetwork address. NetWare file servers record these services by name, service type, and internetwork address in a database. The Service Advertising Protocol requires servers of all types to conform to a set of rules that govern their interaction with NetWare file servers and workstations.

Server Names and Types

All servers that provide the same service through identical application-level protocols are assigned the same service type. Novell assigns unique numbers called Server Types for each unique type of server. Software developers are directed to obtain assignment of a new Server Type when they develop a new type of network server. The NetWare file server has the well-known Server Type of 4. A print server has the well-known Server Type of 3. Each server on an internetwork has a unique name within its Server Type. Server names are usually assigned during server installation. Two file servers can not have the same name. A file server and a print server can have the same name.

Server Internetwork Address

Each server on an internetwork has an internetwork address that includes its local network address, its local node address, and its socket number (or numbers). This address is used to receive service requests and send service responses. The socket numbers can be dynamically assigned by NetWare or they can be static and pre-assigned by Novell. NetWare's Service Advertising Socket is pre-assigned by Novell and is the hexadecimal number 0x0452.

Service Queries

A workstation can broadcast a query to discover the identities of all servers of all types, all servers of a specific type, or the nearest server of a specific type. Additionally a workstation can search a file server's database to discover the names, service types, and internetwork addresses of servers. In the preferred embodiment of the invention, the automatic network configuration method generates a broadcast query when the respective workstation or node is added to a network to aid in determining the most prevalent network operating system and frame type.

NetWare's Service Advertising Protocol includes a Service Query Packet which is used as the SAP broadcast inquiry in the preferred embodiment. Referring now to FIG. 10, a Service Query Packet is used in a process to discover the identities of servers on the internetwork. A basic Service Query Packet has a length of 34 bytes. The fields in the Service Query Packet are shown in FIG. 10 and are also listed below, and the fields are explained below:

| Offset | Content | Type |
| --- | --- | --- |
| 0–29 | IPX Header | BYTE[30] |
| 30–31 | Query Type | WORD |
| 32–33 | Server Type | WORD |

The Query Type field is set to 1 for a General Service Query or a 3 for a Nearest Service Query. During initialization, servers open the Service Advertising Socket and post listen requests. Servers respond to General Service Queries or Nearest Service Queries (Query Types 1 and 3, respectively). The Server Type field indicates the type of server that should respond to this query. The SAP broadcast inquiry of the preferred embodiment sets the Query Type to 3 or Nearest Service Query and sets the Server Type to 4 or file server type. NetWare File servers respond to the SAP broadcast inquiry of the preferred embodiment.

IPX Packet Structure

FIG. 11 illustrates the IPX packet structure, which is used in the NetWare protocol. As shown, this packet structure includes the following fields: Checksum, Length, Transport Control, Packet Type, Destination Network, Destination Node, Destination Socket, Source Network, Source Node, Source Socket, and Data Portion. Bytes 0–29 of this structure form the IPX header in the service query packet shown in FIG. 10. Also, when the IPX packet is a service query packet, the Data Portion of the packet shown in FIG. 11 comprises the Query Type and Server Type shown in FIG. 10. As discussed above, this packet structure is also used in generating a broadcast query to discover the prevalence of network operating systems and services.

VINES ARP

Figure 9:
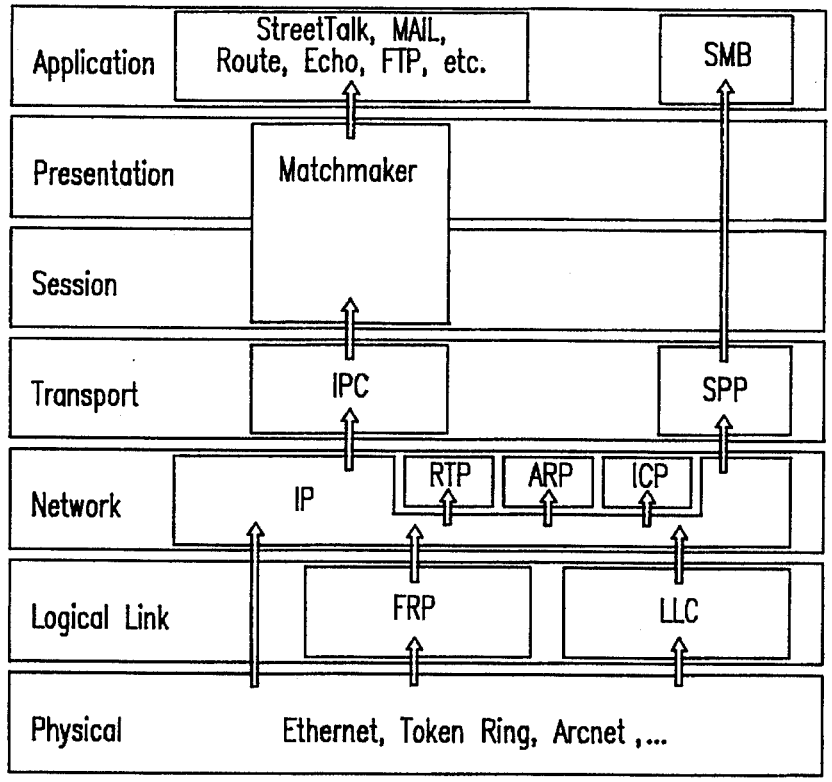
FIG. 9 illustrates the data transfer protocol for the Banyan VINES operating system.

FIG. 9 illustrates the various protocols used by the Banyan VINES operating system shown in reference to the ISO reference model illustrated in FIG. 6. As shown, Banyan VINES includes several application layer protocols including a StreetTalk protocol used in Banyan VINES to maintain a distributed directory of the names of network resources, a MAIL protocol for the transmission of messages in the VINES distributed electronic mail system, and a Server Message Block (SMB) protocol which is a family of application level commands for LAN servers. A protocol referred to as Matchmaker resides in the presentation and session layers and is used by the VINES service that provides high level program to program communication and remote procedure calls. Two protocols referred to as Interprocess Communication Protocol (IPC) and Sequence Packet Protocol (SPP) reside at the transport layer. The IPC protocol is a transport level protocol providing reliable message service and unreliable datagram service. The SPP protocol is a transport level protocol to provide virtual connection service based upon the protocol of the same name in XNS. The network layer includes several protocols including a Routing update Protocol (RTP) used to distribute network topology information, an Address Resolution Protocol (ARP) used for finding a node's DLC addresses from its IP address, an Internet Control Protocol (ICP) used to broadcast notification of errors and to note changes in network topology, and an Internet protocol (IP) that moves datagrams throughout the network. The logical link layer includes a fragmentation protocol (FRP) which breaks up and reassembles network layer packets to make them acceptable to the datalink protocol in the underlying physical medium. The logical link layer also includes a logical link control (LLC) protocol that provides connection control and multiplexing to subsequent imbedded protocols. As noted, the physical layer can be configured according to Ethernet, Token Ring, or Arcnet, as well as others.

In the preferred embodiment, the automatic network configuration method of the present invention utilizes the VINES Address Resolution Protocol (ARP) running over VINES Internet Protocol (IP) to determine the prevalence of the VINES network operating systems and the use of frame types on a network. VINES ARP is used to assign unique Internet addresses to nodes without Internet addresses.

VINES ARP defines two types of protocol entities: an address resolution service and an address resolution client. An address resolution service is implemented within VINES servers as a routing server. An address resolution client is implemented in a node that is not pre-assigned a unique VINES Internet address. Address resolution clients are usually implemented in client nodes that support VINES protocols, such as DOS or OS/2 workstations.

Service Queries

Figure 12:
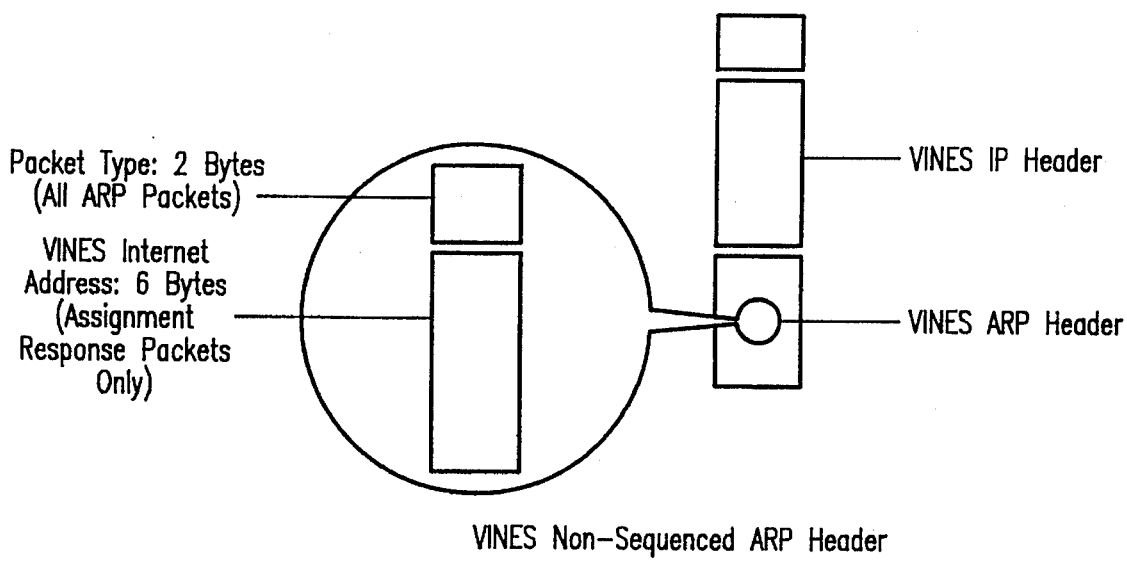
FIG. 12 illustrates a VINES non-sequenced Address Resolution Protocol (ARP) header.
Figure 13:
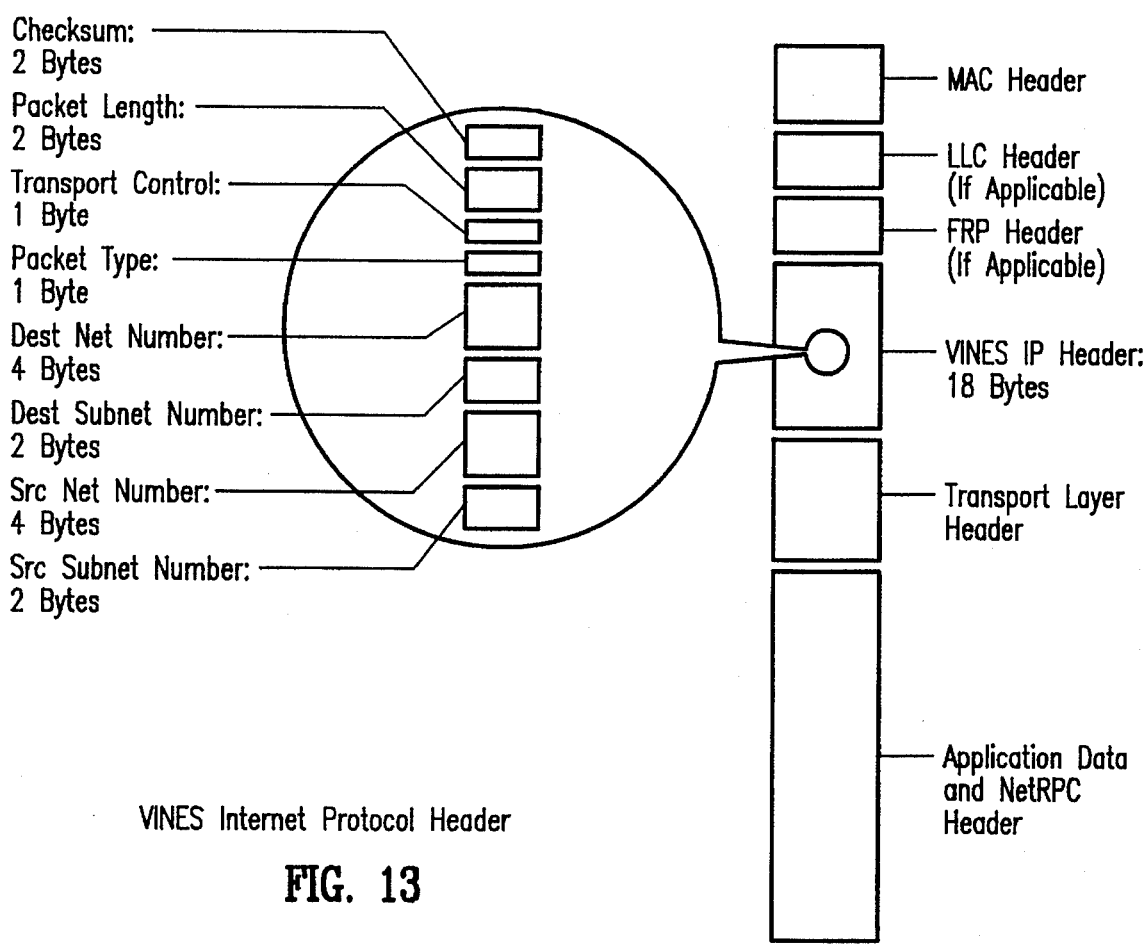
FIG. 13 illustrates a VINES Internet Protocol header.

When a client node loads VINES software, the address resolution client issues broadcasts to find a routing server or address resolution service. Each VINES server responds to the broadcast. The first server to respond becomes the routing server. The broadcast inquiry is used by the automatic network configuration method of the present invention to determine the prevalence of network operating systems and frame types. This broadcast inquiry preferably includes an ARP header and Internet Protocol (IP) header illustrated in FIGS. 12 and 13, respectively.

Two implementations of the VINES ARP are currently supported, these being sequenced ARP and non-sequenced ARP. The sequenced ARP is designed to work with sequenced RTP. The non-sequenced ARP is designed to work with non-sequenced RTP and is simpler than sequenced ARP. Non-sequenced ARlP is the older of the two VINES ARP implementations. In order to interoperate, nodes that support sequenced ARP also support non-sequenced ARP. The VINES ARP broadcast inquiry of the preferred embodiment uses the non-sequenced ARP header illustrated in FIG. 12. The non-sequenced ARP header, illustrated in FIG. 13, follows the VINES IP header.

Figure 14:
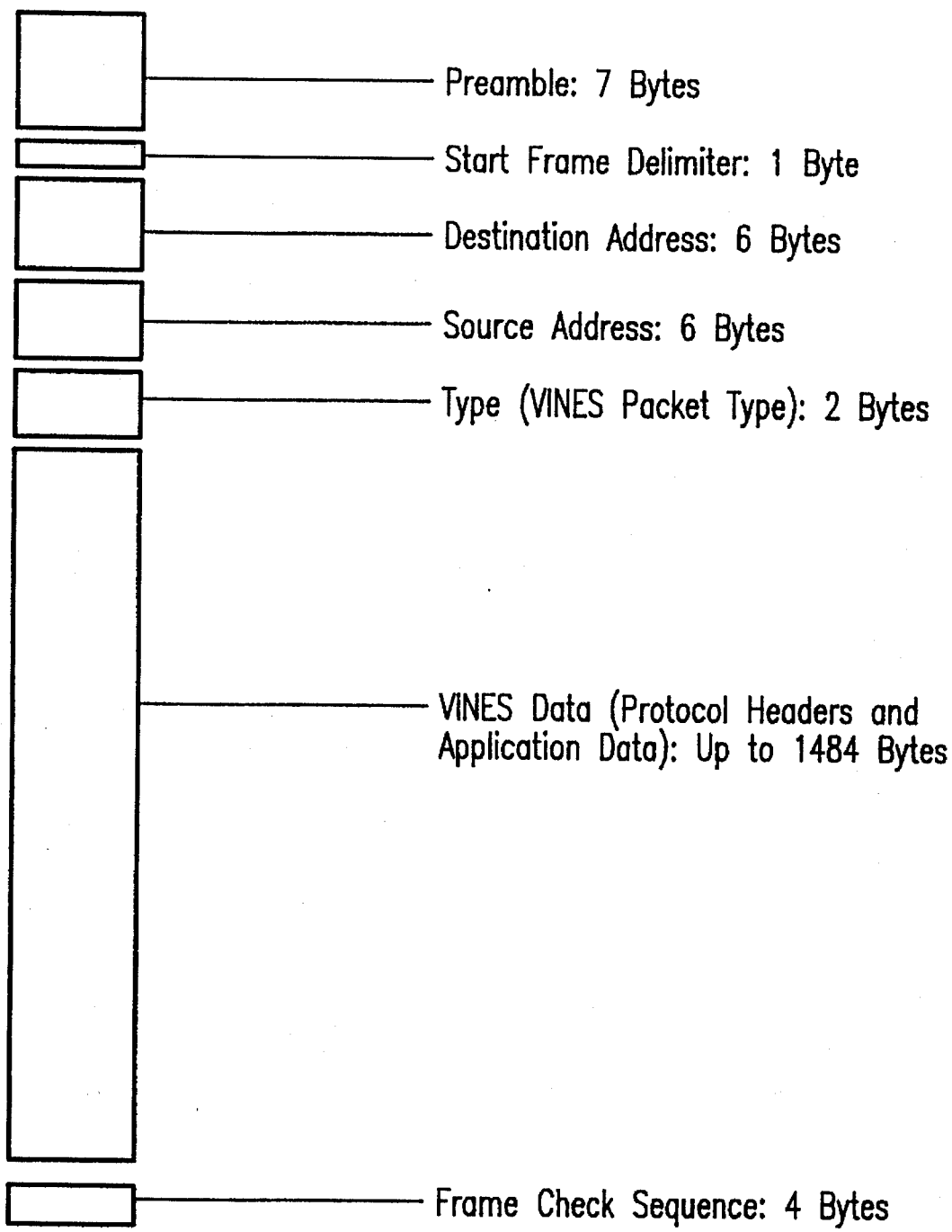
FIG. 14 illustrates a VINES Ethernet frame.
Figure 15:
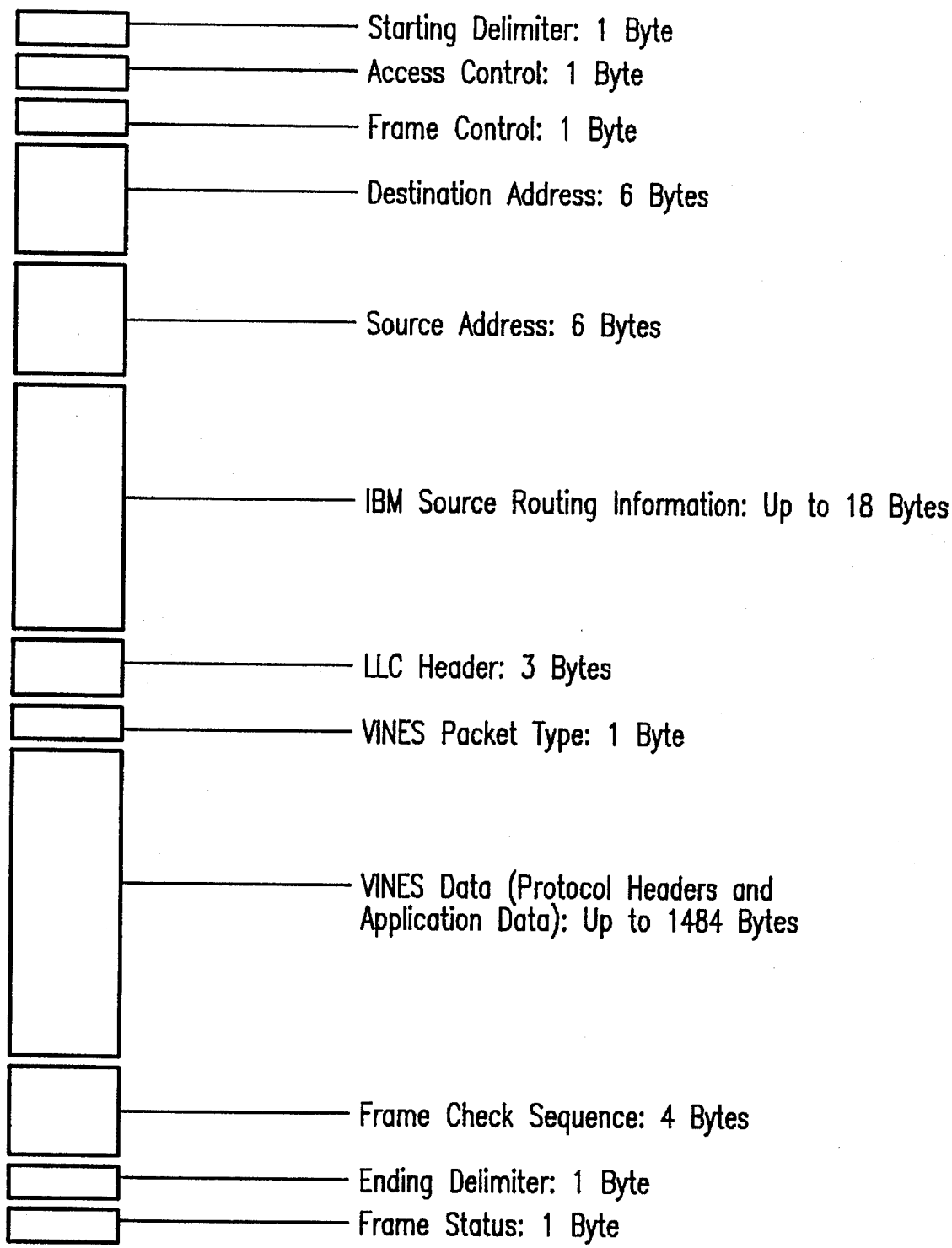
FIG. 15 illustrates a VINES Token Ring frame.

FIG. 14 illustrates a VINES Ethernet frame and FIG. 15 illustrates a VINES Token Ring frame. The Ethernet and Token Ring frames are used to transport broadcast inquiries. The appropriate frame header is preferably prepended by the network interface card 250 prior to the broadcast going out over the network.

Conclusion

Therefore, a method and apparatus for automatically configuring a client computer being added to a network according to the most prevalent operating system, the most prevalent data transfer protocol frame type is shown. The present invention removes the necessity of a network administrator or information systems manager to individually and manually configure each client computer being added to a network. This results in a considerable savings of time and expense.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A network service detection method for automatically detecting at least one feature of each of a plurality of nodes interconnected into a network, wherein features of said nodes include responsiveness to one or more network operating system inquiries and one or more frame types, and wherein an additional node interconnected to said network is a first computer system, the method comprising the steps of:

broadcasting from said first computer system one or more inquiries for each of said network operating systems to said plurality of nodes, wherein each inquiry uses a frame type;

receiving responses from nodes on said network which are responsive to at least one of said network operating systems and frame type used by any of said one or more inquiries; and examining the received responses to determine at least one of said features of said nodes on said network and to determine a most prevalent operating system being used on said network; and configuring said first computer system to use said most prevalent operating system.

2. The method of claim 1 wherein the one or more network operating systems include a first network operating system and a second network operating system.

3. The method of claim 2, wherein said step of configuring comprises changing one or more configuration files in said first computer system to load one of said first or second network operating systems upon power up of said first computer system.

4. The method of claim 1, further comprising:

displaying a selected network configuration after said step of examining; and receiving user acceptance of said selected network configuration after said step of displaying;

wherein said step of configuring occurs after said step of receiving said user acceptance.

5. The method of claim 1, further comprising: restarting said first computer system after said step of configuring.

6. The method of claim 1, wherein the one or more network operating systems include a first network operating system and a second network operating system, and wherein said first network operating system includes a first number of possible frame types, and said second network operating system includes a second number of possible frame types, the method further comprising the steps of:

repeating said step of broadcasting using different ones of said first number of frame types during each broadcast;

wherein said step of examining comprises examining said received responses to determine the frame types being used on said network.

7. The method of claim 1 wherein said step of broadcasting comprises broadcasting at least a first number of inquiries, wherein each of said first number of inquiries uses a different frame type; and wherein said step of broadcasting comprises broadcasting at least a second number of inquires, wherein each of said second number of inquiries uses a different frame type.

8. The method of claim 6, further comprising:

configuring said first computer system according to a frame type determined to be in use on said network.

9. The method of claim 8, wherein said step of examining further comprises examining said received responses to determine a most prevalent frame type being used on said network; and wherein said step of configuring comprises configuring said first computer system according to the most prevalent frame type determined in said step of examining.

10. The method of claim 9, wherein said step of examining further comprises examining said received responses to determine a most prevalent of said first and second operating systems being used on said network; and wherein said step of configuring further comprises configuring said first computer system to use the most prevalent operating system determined in said step of examining.

11. The method of claim 1, further comprising:

storing said received responses in a network configuration table;

wherein said step of examining said received responses comprises examining said network configuration table.

12. The method of claim 1, wherein said nodes include file servers on said network.

13. The method of claim 1, wherein a first network operating system is the VINES operating system, and wherein said one or more broadcast inquiries for said first network operating system comprise VINES Address Resolution Protocol inquiries.

14. The method of claim 13, wherein said network is an Ethernet network, and wherein said one or more broadcast inquiries for said first network operating system comprise a VINES Address Resolution Protocol inquiry using an Ethernet II frame type.

15. The method of claim 13, wherein said network is a Token Ring network, and wherein said one or more broadcast inquiries for said first network operating system comprise VINES Address Resolution Protocol inquiries using an 802.2 frame type and an 802.2 SNAP frame type.

16. The method of claim 1, wherein a first network operating system is the NetWare operating system, and wherein said one or more broadcast inquiries for said first network operating system comprise NetWare Service Advertising Protocol inquiries.

17. The method of claim 16, wherein said network is an Ethernet network, and wherein said one or more broadcast inquiries for said first network operating system comprise NetWare Service Advertising Protocol inquiries using an Ethernet II frame type, an 802.3 "raw" frame type, an 802.2 frame type, and an 802.2 SNAP frame type.

18. The method of claim 16, wherein said network is a Token Ring network, and wherein said one or more broadcast inquiries for said first network operating system comprise NetWare Service Advertising Protocol inquiries using an 802.2 frame type and an 802.2 SNAP frame type.

19. The method of claim 20, wherein said first operating system includes a first number of possible frame types, wherein said step of broadcasting one or more inquiries for said first network operating system comprises broadcasting one or more inquiries using different ones of said first number of frame types;

wherein said second operating system includes a second number of possible frame types, wherein said step of broadcasting one or more inquires for said second network operating system comprises broadcasting one or more inquires using different ones of said second number of frames types;

wherein said step of examining comprises examining said stored responses to determine the most prevalent frame type being used on said network; and wherein said step of configuring comprises configuring said added computer according to the most prevalent frame type determined in said step of examining.

20. A method for automatically configuring a computer being added to a network having other computers, wherein said network includes one of either a first network operating system or a second network operating system, comprising the steps of:

broadcasting from said added computer one or more inquiries for a first network operating system to said other computers on said network;

receiving responses from said computers on said network using said first network operating system;

broadcasting from said added computer one or more inquiries for a second network operating system to said other computers on said network;

receiving responses from said other computers on said network using said second network operating system;

examining said received responses to determine an existence of said other computers on said network using said first network operating system and an existence of said computers on said network using said second network operating system;

determining a most prevalent network operating system of said first and second operating systems being used on said network; and after said step of determining configuring said added computer according to said most prevalent one of said first and second network operating systems being used on said network.

21. A method for automatically configuring a computer system being added to a network having other computer systems, wherein said network includes at least one of a plurality of network operating systems, wherein each network operating system includes one or more possible frame types, the method comprising the steps of:

broadcasting from said added computer system one or more inquiries for a first of said network operating systems, wherein each of said one or more inquiries uses a first of said frame types;

receiving responses to said one or more inquiries from said other computer systems on said network, said other computer systems having said first network operating system and using said first frame type;

repeating said broadcasting step for each of said network operating systems using each of said frame types until each frame type has been used with each inquiry for each network operating system;

repeating said receiving step until responses to all of said inquiries have been received from said other computer systems having said network operating system for which said inquiry was broadcasted and using said frame type;

examining said received responses to determine types of network operating systems and frame types being used on said network and to determine a most prevalent network operating system being used on said network; and configuring said added computer system according to said most prevalent network operating system determined in said step of examining and at least one of said frame types after said step of examining.

22. The method of claim 21, wherein said step of examining further comprises examining said received responses to determine the most prevalent frame type being used on said network; and wherein said step of configuring further comprises configuring said added computer system using the most prevalent frame type determined in said step of examining.

23. The method of claim 21, wherein said step of broadcasting comprises broadcasting at least three identical inquiries using a second of said frame types and broadcasting three of said identical inquiries using a third frame type.

24. The method of claim 21, wherein said step of configuring comprises changing one or more configuration files in said added computer system to load one of said network operating systems upon power up of said added computer system.

25. The method of claim 21, further comprising:

displaying a selected network configuration after said step of examining; and receiving user acceptance of said selected network configuration after said step of displaying;

wherein said step of configuring occurs after said step of receiving said user acceptance.

26. The method of claim 21, further comprising:

restarting said added computer system after said step of configuring.

27. A computer system which automatically detects at least one feature of each of a plurality of nodes interconnected in a network to which said computer system is attached, wherein features of the nodes include a network operating system and a frame type, the computer system comprising:

memory for storing one or more network operating systems;

a network interface card coupled to said memory for interfacing to said network;

broadcasting means coupled to said network interface card for broadcasting to said nodes one or more inquiries for each of said one or more network operating systems, wherein each inquiry uses a frame type;

receiving means coupled to said network interface card for receiving responses to said one or more inquiries from said nodes on said network using said network operating system and frame type used by any of said one or more inquiries;

storing means coupled to said receiving means for storing said received responses;

determining means coupled to said storing means for determining said network operating systems on said network and for determining a most prevalent network operating system being used on said network using said stored responses; and configuring means coupled to said determining means for configuring said first computer system according to said most prevalent network operating system determined by said determining means.

28. The computer system of claim 27, wherein said broadcasting means broadcasts said one or more inquiries using different frame types appropriate for the network operating system inquiry being made; and wherein said determining means determines the frame types being used on the network.

29. The computer system of claim 28, further comprising:

configuring means coupled to said determining means for configuring said first computer system according one of said frame types determined by said determining means.

30. The computer system of claim 27, further wherein said one or more network operating systems include a VINES network operating system and a NetWare network operating system; and wherein first, second, and third inquiries each comprise a VINES Address Resolution Protocol using an Ethernet II frame type; and wherein fourth, fifth, sixth, and seventh inquiries each comprise a NetWare Service Advertising Protocol using an Ethernet II frame type, an 802.3 "raw" frame type, and 802.2 frame type, and an 802.2 SNAP frame type, respectively.

31. A computer system node which automatically configures itself to a network to which the computer system is attached, comprising:

memory for storing one or more network operating systems;

a network interface card coupled to said memory for interfacing to said network;

broadcasting means coupled to said network interface card for broadcasting one or more inquiries for said one or more network operating systems to other nodes on said network, wherein said one or more inquiries use different frame types appropriate for said network operating system inquiry being made;

receiving means coupled to said network interface card for receiving responses from said other nodes on said network;

storing means, coupled to said receiving means, for storing said received responses;

determining means coupled to said storing means for determining said network operating systems and frame types being used on said network using said stored responses; and configuring means coupled to said determining means for configuring said computer system according to a particular network operating system and a particular frame type using said stored responses;

wherein said means for configuring includes means for examining said stored responses to determine almost prevalent operating system being used on said network; and wherein said means for configuring configures said computer system using said most prevalent operating system determined by said means for examining.

32. The computer system of claim 31, wherein said means for examining examines said stored responses to determine a most prevalent frame type being used on said network; and wherein said means for configuring configures said computer system using said most prevalent frame type determined by said means for examining.

33. The computer system of claim 31, wherein said one or more network operating systems stored in said memory include a first network operating system including a first number of frame types and a second network operating system including a second number of frame types;

wherein said means for broadcasting broadcasts at least a first number of inquiries, wherein each of said first number of inquiries uses a different one of said first number of frame types; and wherein said means for broadcasting broadcasts at least a second number of inquiries, wherein each of said second number of inquiries uses a different one of said second number of frame types.

34. The computer system of claim 33, further comprising:

a video display coupled to said determining means and said storing means for displaying said network operating systems and frame types being used on said network.

* * * * *